(12) United States Patent
Dzombak et al.

(10) Patent No.: US 12,365,286 B2
(45) Date of Patent: Jul. 22, 2025

(54) ENHANCED VEHICLE AUDIO SEAT EXCITATION WITH INDIVIDUAL PASSENGER CONTROLS

(71) Applicant: Auto Konnect, LLC, Troy, MI (US)

(72) Inventors: Ivan Dzombak, Pinckney, MI (US); Allan Miramonti, Farmington, MI (US); Alan Birkle, Madison, WI (US)

(73) Assignee: Auto Konnect LLC, Troy, MI (US)

( * ) Notice: Subject to any disclaimer, the term of this patent is extended or adjusted under 35 U.S.C. 154(b) by 67 days.

(21) Appl. No.: 18/058,474

(22) Filed: Nov. 23, 2022

(65) Prior Publication Data

US 2023/0158951 A1 May 25, 2023

Related U.S. Application Data

(60) Provisional application No. 63/264,568, filed on Nov. 24, 2021.

(51) Int. Cl.
*B60Q 9/00* (2006.01)
*B60N 2/90* (2018.01)
*G06F 3/16* (2006.01)
*H04R 1/02* (2006.01)
*H04R 3/04* (2006.01)

(52) U.S. Cl.
CPC ............. *B60Q 9/00* (2013.01); *B60N 2/90* (2018.02); *G06F 3/165* (2013.01); *H04R 1/025* (2013.01); *H04R 3/04* (2013.01); *H04R 2430/01* (2013.01); *H04R 2499/13* (2013.01)

(58) Field of Classification Search
CPC ...... B60Q 9/00; B60N 2/90; B60N 2002/981; G06F 3/165; H04R 1/025; H04R 3/04; H04R 2430/01; H04R 2499/13; H04R 2400/03; H04R 5/023

See application file for complete search history.

(56) References Cited

U.S. PATENT DOCUMENTS

| | | | |
|---|---|---|---|
| 2019/0107994 A1* | 4/2019 | Trestain | H04R 29/001 |
| 2019/0300020 A1* | 10/2019 | Alexiou | G05B 9/00 |
| 2021/0316646 A1* | 10/2021 | Mergl | H04R 1/025 |
| 2022/0072986 A1* | 3/2022 | Chang | B60N 2/02246 |
| 2022/0358818 A1* | 11/2022 | Lamy | A47C 7/727 |
| 2023/0147411 A1* | 5/2023 | Kim | B60N 2/003 180/272 |
| 2024/0268561 A1* | 8/2024 | Franco | A47C 7/72 |

* cited by examiner

*Primary Examiner* — Abby Y Lin
*Assistant Examiner* — Dylan M Katz
(74) *Attorney, Agent, or Firm* — Knobbe, Martens, Olson & Bear, LLP

(57) ABSTRACT

Systems and methods for enhanced vehicle audio seat vibration with individual passenger controls. An example system includes a controller configured to obtain an input audio signal. The controller filters the input audio signal via one or more filters, with the one or more filters including a low-pass filter. The controller is in communication with a multitude of intensity controllers usable by respective persons within a vehicle, with the intensity controllers specifying respective intensities. The controller configures an amplifier based on the respective intensities, and the amplifier causes output from seat exciters configured for mounting on seats of the persons.

20 Claims, 20 Drawing Sheets

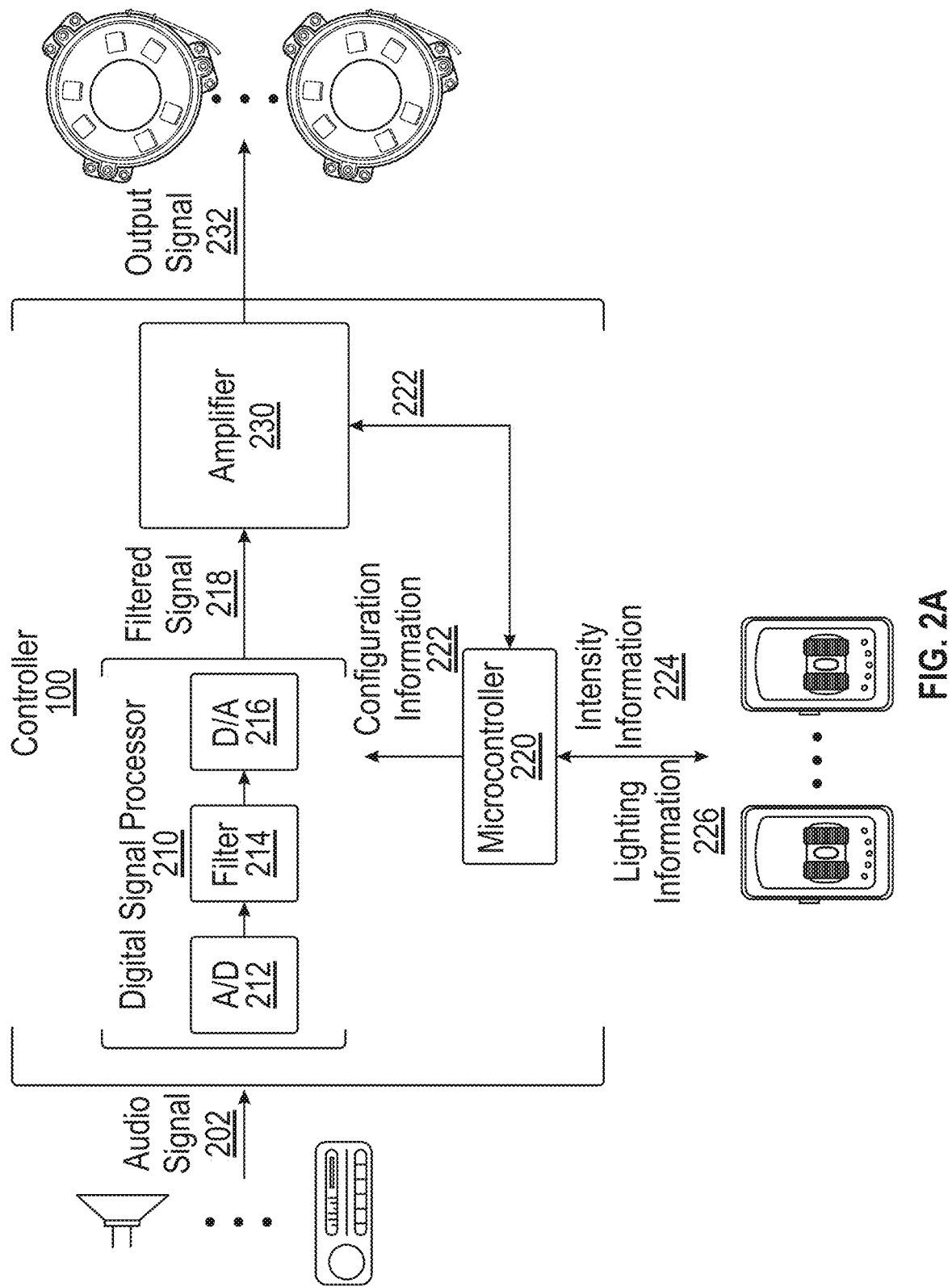

ENHANCED VEHICLE AUDIO SEAT EXCITATION WITH INDIVIDUAL PASSENGER CONTROLS

CROSS-REFERENCE TO RELATED APPLICATIONS

This application claims priority to U.S. Prov. Patent App. No. 63/264,568 filed on Nov. 24, 2021 and titled "ENHANCED VEHICLE AUDIO SEAT EXCITATION WITH INDIVIDUAL PASSENGER CONTROLS," the disclosure of which is hereby incorporated herein by reference in its entirety.

BACKGROUND

Field

The present disclosure relates to vehicles, and more particularly to enhanced audio for vehicles.

Description of the Related Art

Vehicle audio has typically relied upon speakers positioned about the interior of the vehicle. For example, a vehicle may have a first speaker and a second speaker positioned at the front-left and the front-right of the vehicle. In this example, the vehicle may thus output stereo audio to persons within the vehicle. As may be appreciated, vehicles are increasingly using more complex software to allow for higher quality audio output. For example, vehicles may allow for streaming of high-quality audio using cellular connections. Thus, there is a greater emphasis being placed on high-quality immersive audio.

At present, immersive audio experiences require costly and sophisticated speakers to cover differing frequency ranges of audio. For example, certain speakers (e.g., tweeters, mid-range speakers) may be positioned in a vehicle to cover mid-level and higher frequencies. For lower frequencies, subwoofers may be placed in the vehicle. Since the subwoofers are typically quite large, they may commonly be positioned in open spaces in the vehicle (e.g., a trunk). Additionally, subwoofers may require additional components (e.g., capacitors) to function correctly.

While the above-described speakers may allow for high-quality audio, use of these speakers may require substantially loud volumes to reap the immersive benefits. Additionally, the subwoofers may be audible outside of the vehicle and cause resonance/shaking problems with the vehicle.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIG. 2A is a block diagram illustrating detail of an example controller included in a vehicle.

DETAILED DESCRIPTION

Introduction

This specification describes enhanced, immersive, audio experiences for vehicles which allows music to be felt by persons in seats of the vehicles. As will be described, a vehicle may be outfitted, or retrofitted, with one or more elements attached to one or more seats within the vehicle. The element, which is referred to herein as a seat exciter, may be configured to shake, rumble, or otherwise be perceptible in feel, to a person sitting on a seat. For example, the element may represent a transducer which converts input audio into a vibration, shaking, rumbling, and so on. In this example, the shaking may be generated via an internal element (e.g., movement of a magnet). In some embodiments, the seat exciter may be a tactile transducer and may allow for vibrations within a particular frequency range (e.g., 1 Hz to 20 Hz, 50 Hz to 500 Hz, 35 Hz to 2000 Hz, and inclusive ranges therein).

Figure 2B:
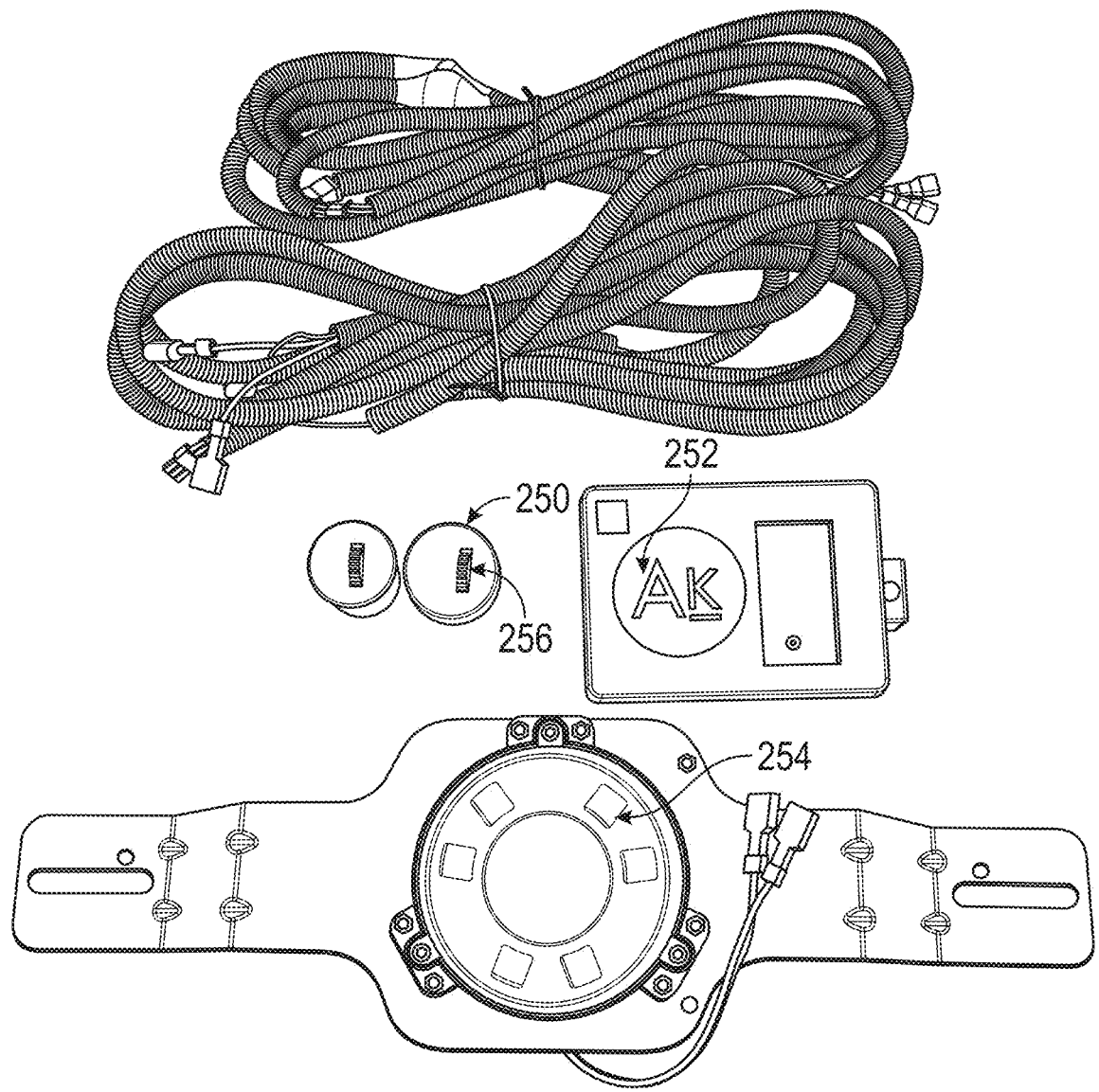
FIG. 2B is an example image depicting a seat exciter, controller, and intensity controller.

The seat exciter, as described herein, may cause vibration of a passenger's seat in response to audio (e.g., music) being played via speakers included in a vehicle. A controller may obtain input audio and process the audio such that it causes activation of the seat exciter. To allow for fine control of an extent to which the seat exciter causes vibration, a passenger may interact with an intensity controller to adjust the output of the seat exciter in real-time. An example intensity controller is illustrated in FIG. 2B and may respond to user input via a physical or software-based control (e.g., a scroll wheel, a slider, a touch screen, and so on).

As will be described, the seat exciter may be connected to the seat in a configuration which allows for output of the seat exciter to cause vibration or shaking of the seat. The seat exciter may adhere, for example via a mounting mechanism described herein, to a rear portion of the seat. Advantageously, in some embodiments different mounting mechanisms and/or techniques may be employed according to characteristics of the seat (e.g., whether the seat has ventilation in the rear portion of the seat). Since the seat exciter may rest in close contact with the seat, such as in contact with an underlying frame or structure of the eat, the output energy of the seat exciter may be substantially used for shaking rather than creating audible noise.

The above-described vibration may therefore add an extra dimension, such as a tactile feel, to music which would not otherwise be available to persons in the vehicle. As may be appreciated, many vehicles lack high-end audio components such that the auditory experience is lacking. Described herein are thus techniques to supplement existing audio components in vehicles. As will be described, advantageously this supplementation may be enabled using easy-to-install components and wiring harnesses.

As may be appreciated, causing activation of a seat exciter or causing output of, or from, a seat exciter may represent the controller outputting a signal for input to the seat or exciter. The signal, as will be described, may represent an amplified, and filtered, signal which causes an internal element in the seat exciter to move. In this way, activation of the seat exciter may result in shaking, rumbling, and/or vibrating, of a seat.

Advantageously, seat exciters may be mounted on multiple seats of a vehicle. For example, a driver may have a first seat exciter mounted on his/her seat while a passenger (e.g., a front passenger) may have a second seat exciter mounted on his/her seat. In this example, the driver and passenger may separately adjust an extent to which their respective seat exciters cause shaking, rumbling, and so on, of their seats (herein referred to as an intensity). Each seat exciter may, in some embodiments, be controllable via a respective intensity controller. For example, the above-described driver and passenger may use separate intensity controllers to adjust the intensity associated with the shaking or rumbling of their seats. Additionally, each person may separately turn on and turn off their respective seat exciter.

The intensity controllers may represent discrete units which are physically adjustable by persons within a vehicle. For example, an intensity controller may have a slider, a wheel, or other interface element which is adjustable. In some embodiments, an intensity controller may be effectuated using an application executing on a user device of a person (e.g., a smart phone). For example, the person may provide input to the application to cause a corresponding adjustment of his/her seat exciter.

While the above focuses on causing output of seat exciter(s) based on music, in some embodiments the techniques described herein may allow for a person in a vehicle to feel information related to operation of the vehicle. For example, and as described in FIGS. 6-7 below, the controller may be in communication with a controller area network (CAN). In this example, the controller may cause output of a seat exciter (e.g., from a seat exciter) based on information reflected in one or more messages being provided via the CAN bus. As another example, and as described in FIGS. 8-9 below, the controller may cause output of a seat exciter based on detection of certain words in input audio (e.g., a verbal command, navigation prompt, and so on). For example, navigation software may indicate that the person is to turn left. In this example, the controller may cause the seat exciter to output a particular pattern of vibration or rumbling which indicates the upcoming turn.

While the description herein focuses on use of seat exciters, such as tactile transducers, in some embodiments the seat exciters may output audio. For example, the seat exciters may represent discrete units which output low frequency audio usable to substantially shake or rumble a seat. In this example, the low frequency audio may represent audio less than 20 Hz, 15 Hz, and so on.

Block Diagrams

Figure 1A:
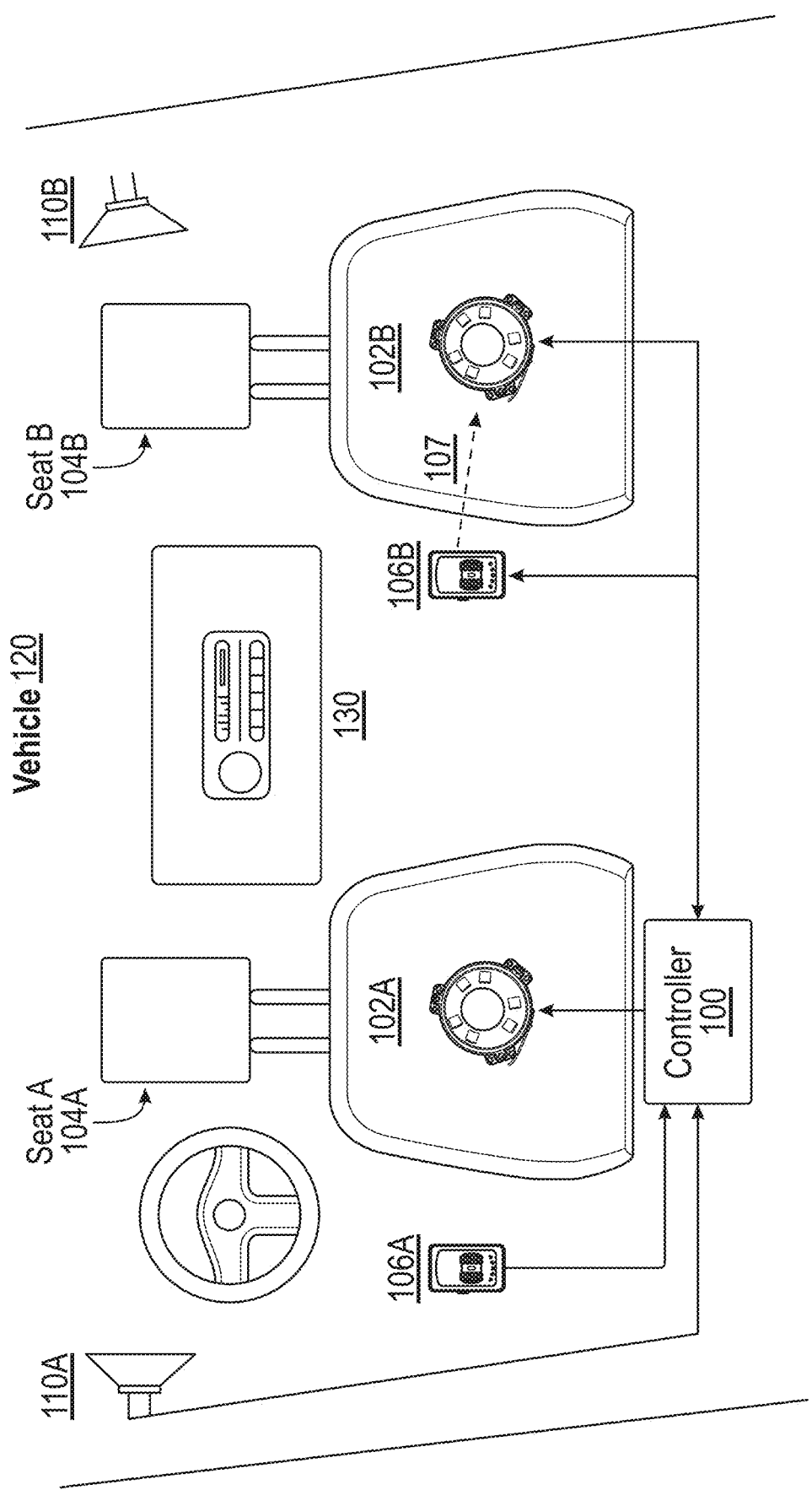
FIG. 1A is a block diagram of a vehicle which includes seat exciter(s) and a controller.

FIG. 1A is a block diagram of a vehicle 120 which includes seat exciter(s) 102A-102B and a controller 100. In the illustrated example, the vehicle 120 includes speakers 110A-110B which represent front-left and front-right speakers of the vehicle 120. Additionally, an audio output device 130 is positioned at a front of the vehicle 120 for use by persons within the vehicle 120. Seats 104A-104B are included at the front of the vehicle, such as a front driver and a front passenger seat.

Seat exciters 102A-102B are illustrated as being associated with seats 104A-104B. As an example, each seat exciter may be mounted on a portion of an associated seat. For this example, the mounting may include attaching the seat exciter to an underlying structural element of the seat. An example structural element may include a metal portion which forms a frame of the seat. As an example, the metal portion may be positioned under fabric and/or cushion material which is used to form a backrest of the seat.

Another example structural element on which a seat exciter may be positioned may include a panel of a seat. For example, seat 104A may include a frame which defines the outlines (e.g., extremities) of the seat 104A. In this example, the rear portion of the seat 104A may include one or more panels which extend across the back of the rear portion thus connecting a left and a right outline of the seat 104A. The seat exciter 102A may be mounted to, or otherwise connected to, a central (e.g., substantially central) portion of a particular panel. For example, the seat exciter 102A may be mounted, or otherwise connected, to the middle (e.g., substantially middle) of the particular panel.

Figure 3:
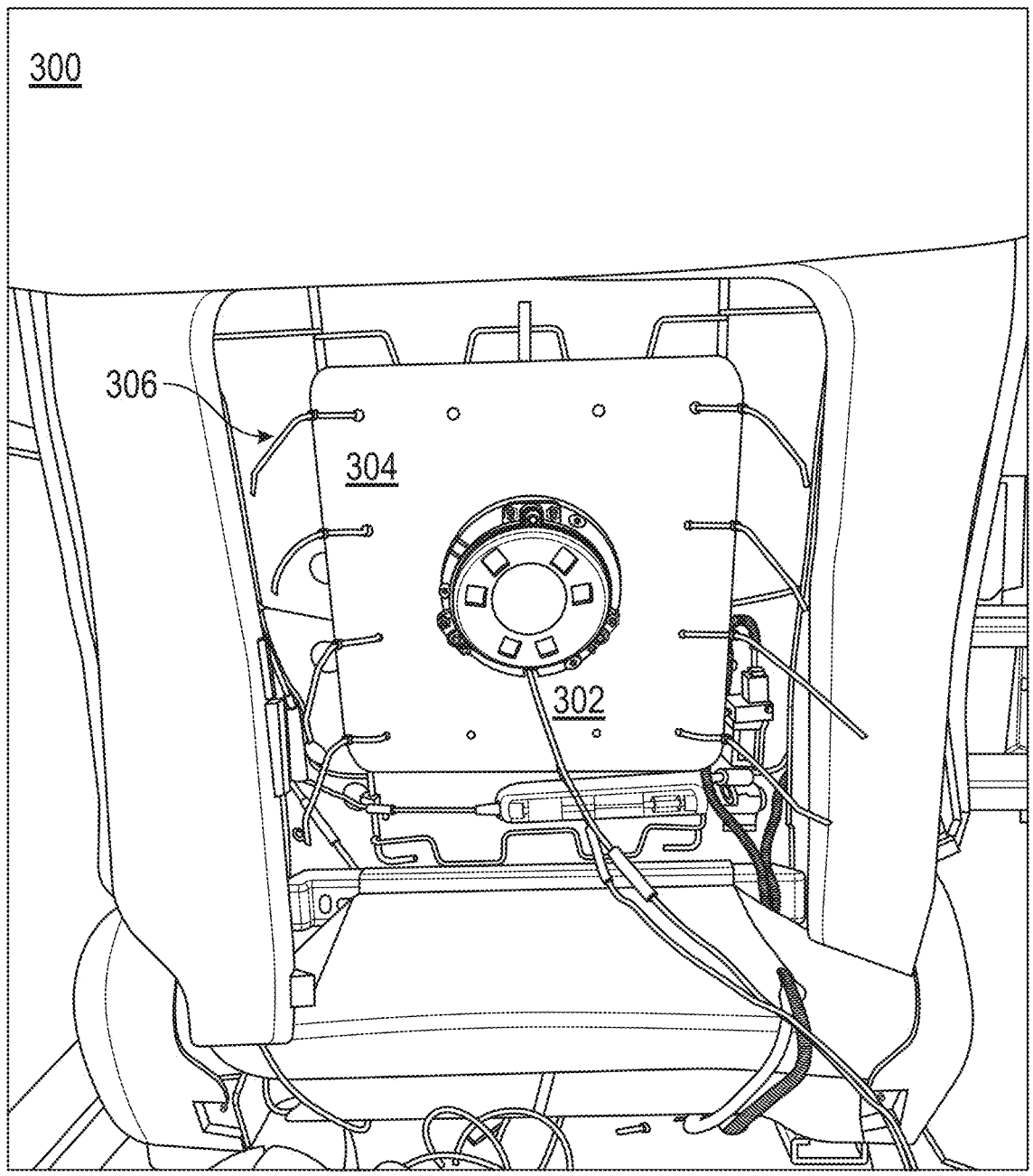
FIG. 3 illustrates an example seat exciter mounted on a rear of a vehicle seat which does not include venting.
Figure 4:
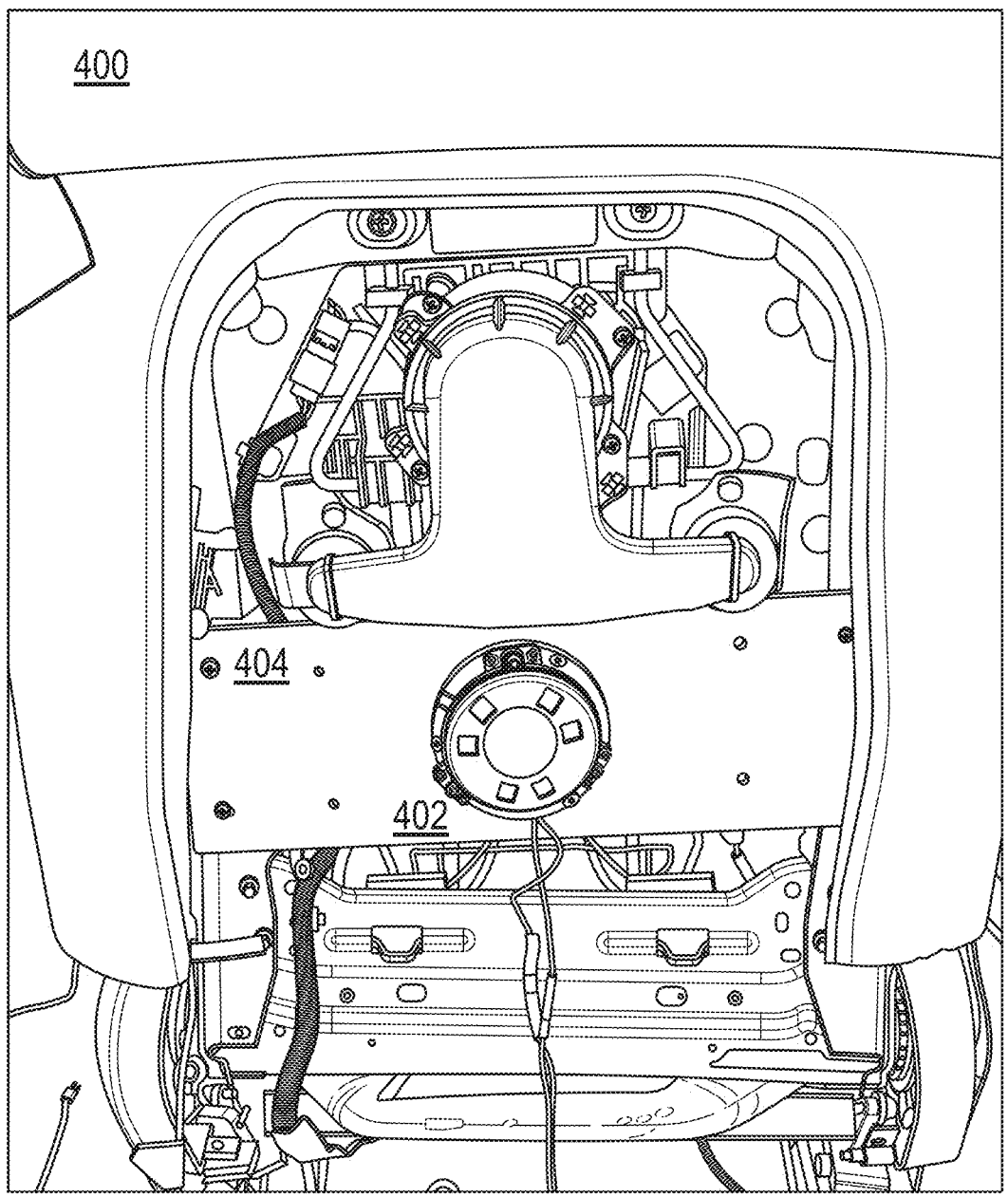
FIG. 4 illustrates an example seat exciter mounted on a rear of a vehicle seat which includes venting.

With respect to the above-description related to mounting, example techniques to mount the seat exciter are described in more detail below. For example, FIGS. 3-5H illustrate examples of the seat exciter being mounted. FIG. 3, for example, illustrates the seat exciter being mounted using a board or other material. FIG. 4, for example, illustrates the seat exciter being mounted to a frame of the seat. FIGS. 5A-5H, for example, illustrate mounting using a metal, or other material, portion.

Example mounting of the above-described seat exciter 102A may include attaching a mounting bracket or mechanism to one of the above-described panels. As an example, the mounting bracket or mechanism may have four attachment points which mount, or otherwise connect, to the panel. The panel may represent, in some embodiments, a lower panel which is positioned at a lower portion of a person's back. The four attachment points may represent four screw holes which are drilled into the panel, or which are existent in the panel. In some embodiments, the mounting bracket may represent a clamp which clamps onto the panel at different positions. For example, the mounting bracket may clamp onto a top and a bottom of the panel.

Another example mounting bracket or mechanism may include a metal portion which extends across a frame of a rear portion of the seat (e.g., the frame which underlies the portion on which a passenger's back rests). Thus, and as illustrated in FIGS. 5A-H, the mounting bracket or mechanism may attach or clamp to a left portion of the frame and a right portion of the frame. A central portion of the bracket or mechanism may receive the seat exciter.

In the above-described mounting techniques, the mounting bracket or mechanism may have a central portion which the seat exciter 102A fits into. For example, the mounting bracket may have a hole in which the seat exciter 102A is inserted. In this example, the seat exciter 102A may have, or be of a shape corresponding to, a substantially circular or oval portion which fits into the hole.

Additional techniques for mounting may include having a mounting bracket which extends across the horizontal width of the rear of the seat 104A. For example, the mounting bracket may be formed from a first portion which is connected in front of (e.g., closer to a front of the vehicle 120)

the frame of the seat 104A (e.g., the rear frame of the seat 104A). In this example, the first portion may connect to the frame via clamps or attachment points (e.g., screen holes). The mounting bracket may also have a second portion which is behind (e.g., closer to a rear of the vehicle 120) the frame of the seat 104A.

In some embodiments, the above-described first portion and second portion may connect to each other. For example, one of the first portions or second portion may have holes in which a bolt, screw, or other portion may be inserted. IN this example, and with respect to the example of the second portion having holes, the first portion may have an extending portion (e.g., a bolt) which is configured to be inserted into holes of the first portion. As norther example, the first portion and second portion may have holes in which a bolt, screw, or other portion, may be inserted.

Examples of mounting techniques, brackets, mechanisms, and soon, are described in more detail below. For example, FIGS. 5A-5G illustrate example mounting brackets which may be used. It may be appreciated that other mounting techniques may be employed and fall within the scope of the disclosure herein.

Once mounted, or otherwise connected, to the seats 104A-104B, the seat exciters 102A-102B may allow for shaking, rumbling, and so on, of the seats 104A-104B. For example, due to the extent to which the seat exciters 102A-102B adhere to the frame, or underlying structure, of the seats 102A-102B, output energy from the seat exciters 102A-102B may substantially be used to shake the associated seats 102A-102B. In some embodiments, and as will be described, the seat exciters 102A-102B or controller 100 may monitor for resonance, or audible vibrations, caused by use of the seat exciters 102A-102B. In this way, adjustments to the mounting of the seat exciters 102A-102B may be effectuated or otherwise flagged for adjustment by an automotive or after-market professional.

The seat exciters, in the illustrated example, are connected to controller 100. The controller 100 may include one or more processors, application specific integrated circuits (ASICs), digital signal processors (DSPs), and so on. In some embodiments, the controller 100 may include one or more amplifiers (e.g., automotive amplifiers) which are usable to output (e.g., drive) signals to the seat exciters 102A-102B. The elements which form the controller may, in some embodiments, be included on a same printed circuit board (PCB).

The controller 100 may be a discrete unit which is positioned within the vehicle 120. As an example, the controller 100 may be positioned under one of the seats 102A-102B (e.g., the driver's seat 102A). For this example, the controller 100 may output signals to cause activation of the seat exciters 102A-102B using wires connected to the seat exciters 102A-102B.

In some embodiments, the controller 100 may access power via a vehicle power tap. In some embodiments, the controller 100 may include, or be in wired connection with, one or more amplifiers. An amplifier may access power via a vehicle power tap as described above. Thus, the controller 100 may output signals to cause activation of the seat exciters 102A-102B which may then cause shaking, or rumbling, of the seats 104A-104B based on the vehicle power.

To generate signals which cause activation of the seat exciters 102A-102B, the controller 100 may receive input audio which is associated with the audio output device 130. As an example, a person within the vehicle 120 may use the device 130 to play music or audio. Without being constrained by way of example, the audio output device 130 may be used to select a radio station. The device 130 may also be used to play streaming audio associated with one or more streaming audio applications. The device 130 may also allow for playing tapes, compact discs, and so on. The device 130 may also represent a display which is configured to play streaming content (e.g., movies, tv-shows, and so on). Thus, the input audio may represent any audible content, such as music, audio associated with video content, device 130 sounds, alerts, notifications, and so on.

In some embodiments, one of the speakers may be wired to the controller 100. As illustrated in FIG. 1A, the front-left speaker 110A is wired to the controller 100. Thus, the controller 100 may obtain either mono-audio or one of two stereo channels. As may be appreciated, lower-frequency audio may be substantially similar between the front-left 110A and front-right 110B speakers. Thus, to enhance the simplicity of enabling the techniques described herein (e.g., reducing an extent to which new wiring is required), in some embodiments one of the speakers may be used by the controller 100 for input audio. In some embodiments, the controller 100 may be connected to two or more speakers (e.g., speakers 110A-110B). Example wiring techniques, such as wiring harnesses, are described in more detail below with respect to FIG. 6.

While the controller 100 may be connected to speaker 110A, in some embodiments the controller 100 may receive output from the audio output device 130 or via other devices or techniques. For example, an analog or digital output from the audio output device 130 may be received by the controller 100. As another example, the controller 100 may be in wireless communication with the audio output device 130 (e.g., a Bluetooth connection).

To connect, for example, speaker 110A to the controller 100, simplified and easy-to-install wiring harnesses may be used. For example, wires from the speaker 110A to the controller, along with power to the controller 100, may be included in a same wiring harness and connector. The wiring harness may be run, as an example, from the speaker, under or on top the floor (e.g., floor carpeting), and to the controller 100 (e.g., positioned under or within the seat 102A). Similarly, a wiring harness may extend from the controller 100 to seat exciter 102A. Another wiring harness may similarly extend from controller 100 to seat exciter 102B and may be run under or on top of the floor. Examples of the wiring harnesses are described in more detail below, with respect to at least FIG. 6.

In embodiments in which the controller 100 receives input audio from the speaker 110A, the controller 100 may thus receive analog audio. The controller 100 may include an analog-to-digital converter to convert the analog signal into the digital domain. One or more filters may then be applied to the digital signal, for example a low-pass filter may be used to filter frequencies greater than a threshold. In some embodiments, the threshold may relate to a configuration or specifications associated with the seat exciters 102A-102B. For example, the seat exciters 102A-102B may be configured to cause shaking or rumbling based on an input signal with frequencies less than a threshold. The filters may also include a band pass filter or a low pass filter and a high pass filter. For example, the filters may filter frequencies less than a threshold. In this example, the threshold may represent low frequency shaking or rumbling which may provide a negative experience for a person (e.g., making the person feel uncomfortable or sick).

In FIG. 1A, the controller 100 is causing output from, and thus controlling, both seat exciters 102A-102B. While FIG.

1A illustrates two seat exciters, as may be appreciated the controller 100 may cause output from three or more seat exciters. For example, each seat of the vehicle 120 (e.g., 4, 5, 7, and so on, may be associated with a seat exciter which cause rumbling or shaking of the seat.

Intensity controllers 106A-106B may be used by persons in the vehicle 120 to separately control an extent to which their respective seat exciters 102A-102B cause rumbling or shaking of the seats 104A-104B (e.g., control an intensity associated with the rumbling or shaking). Each intensity controller may be in communication, such as wired or wireless communication, with the controller 100. In some embodiments, each intensity controller may include a dial which a person may adjust upward or down. In some embodiments, each intensity controller may include a slider which a person may adjust to indicate an intensity associated with the rumbling or shaking. Additional techniques to receive input from a person may be employed and fall within the scope of the disclosure herein. For example, each intensity controller may include a touch-sensitive surface on which a person may drag his/her finger. The dragging may be used to indicate a particular intensity.

The intensity controllers 106A-106B may be connected to the controller 100 via respective wiring harnesses. In some embodiments, the intensity controllers 106A-106B may be configured to be attached to a portion of the seats 104A-104B. For example, the intensity controllers may be positioned proximate to seat adjustment controllers which may be present on the vehicle 120 at the time of purchase of the vehicle 120. In this example, the seat adjustment controllers may be positioned at a side (e.g., left side for driver or right side for passenger) of the vehicle 120 and allow the seat to be adjusted in position and/or orientation. The attachment may include applying a sticky substance, such as glue or Velcro, to the intensity controllers 106A-106B and seats 104A-104B. For example, the intensity controllers 106A-106B may be disposed on an outer surface of the seats 104A-104B. In some embodiments, a portion of the seats 104A-104B (e.g., a vinyl portion near the bottom) may be removed and the intensity controllers 106A-106B included therein.

Thus, to wire the intensity controllers 106A-106B the controllers 106A-106B may be connected via wires to the controller 100. With respect to intensity controller 106A, a wiring harness may connect the intensity controller 106A to controller 100A. The wiring harness, for this controller 106A, may be routed around a surface of the seat 104A to the controller 100 which may be under or proximate to the seat 104A. The wiring harness may optionally be routed through the seat 104A. For example, in embodiments in which the intensity controller 106A is included in a portion of the seat 104A, the wiring harness may be routed through the seat 104A (e.g., through an open cavity positioned under the cushion on which a person sits).

With respect to the intensity controller 106B, a wiring harness may connect the controller 106B to controller 100A. An example wiring harness, for this controller 106B, may be routed under or on a surface of a floor of the vehicle 120. Additional techniques to wire the intensity controllers 106A-106B may be employed and fall within the scope of the disclosure herein. In some embodiments, the intensity controller 106B may receive an output signal from the controller 100 to cause activation of seat exciter 102B. For example, the above-described wiring harness may include one or more wires from intensity controller 106B to controller 100 and one or more wires from controller 100 to intensity controller 106B. The intensity controller 106B may thus route the output signal from controller 100 to the seat exciter 102B, for example via optional wiring 107. For example, the intensity controller 106B may pass-through output from the controller 100 to intensity controller 106B.

In some embodiments, the intensity controllers 106A-106B may be in wireless communication with the controller 100. For example, the intensity controllers 106A-106B may provide a AM/FM radio, Bluetooth, or Wi-Fi, signal to which the controller 100 is configured to be responsive. The intensity controllers 106A-106B may optionally represent an application executing on mobile devices of persons in the seats 104A-104B. In this example, the mobile devices may communicate with the controller 100 via Bluetooth, Wi-Fi, and so on.

Persons in the vehicle 120 can thus advantageously use their respective intensity controllers 106A-106B to adjust intensities of the seat exciters 102A-102B in real-time. As will be described below, with respect to FIG. 2A, the intensity controllers 106A-106B may provide information which enables configuration of one or more amplifiers usable to provide signals to the seat exciters 102A-102B. For example, intensity controller 106A may provide information indicating that an intensity associated with seat exciter 102A is to be in a middle of a range of intensities. In this example, an amplifier may be configured to output a signal which causes the seat exciter 102A to shake the seat 104A at the specified intensity.

Figure 1B:
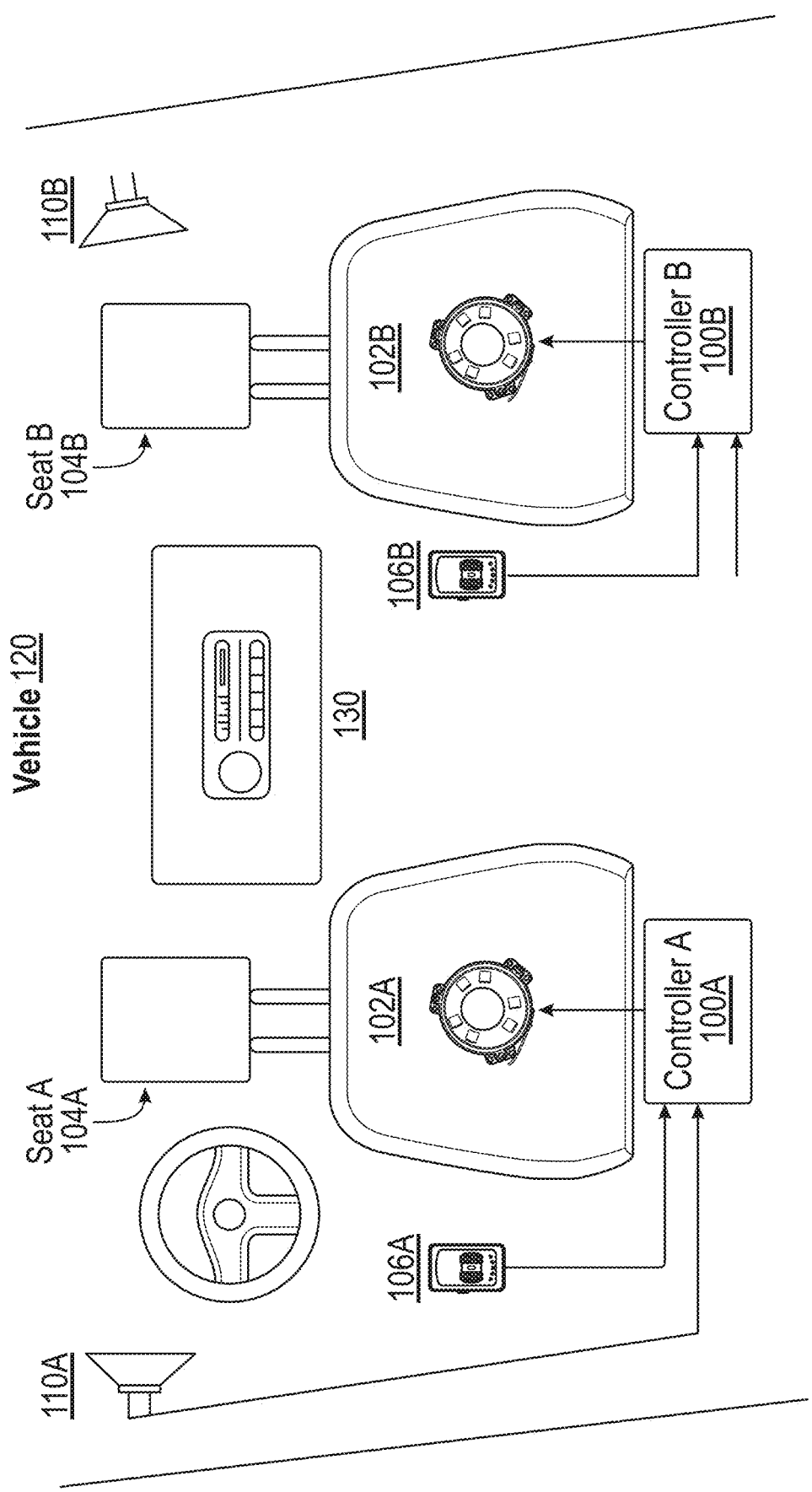
FIG. 1B is a block diagram of the vehicle which includes seat exciter(s) and two controllers.

FIG. 1B is a block diagram of the vehicle 120 which includes seat exciter(s) 102A-102B and two controllers 100A-100B. As described above, with respect to FIG. 1A, a multitude of seat exciters 102A-102B may be controlled by a single controller. In some embodiments, multiple controllers 100A-10B may be used to control respective seat exciters 102A-102B.

As an example, FIG. 1B illustrates controller 100A being used to cause output of seat exciter 102A. For example, controller 100A may receive input audio (e.g., from speaker 110A) and process the input audio into an output signal usable to activate seat exciter 102A. Similarly, controller 100B may cause activation of seat exciter 102B.

In some embodiments, controller 100B may receive input audio from speaker 110A. For example, controller 100B may be in wired connection with speaker 110A. In this example, a wiring harness may be routed to controller 100B from speaker 110A. Optionally, controller 100A may route audio to controller 100B. For example, controller 100A may be in wired or wireless communication with controller 100B.

While not illustrated, in some embodiments each controller may be configured to control up to a threshold number of seat exciters. For example, if the vehicle 120 is a van or minivan, a first controller may output signals to a threshold number of seat exciters. In this example, the threshold number of seat exciters may be associated with a first row of seats, a first and second row of seats, and so on. Similarly, a second controller may output signals to a threshold number of different seat exciters. For example, the different seat exciters may be associated with subsequent rows of the van or minivan. Optionally, the controllers may be daisy-chained together to provide a same input audio signal (e.g., from speaker 110A) to the controllers.

FIG. 2A is a block diagram illustrating detail of an example controller 100 included in a vehicle. The controller 100 may represent the controller described above with respect to FIGS. 1A-1B. As illustrated, the controller 100 receives an audio signal 202 and outputs an output signal 232 to cause activation of seat exciters. As described above, the audio signal 202 may be obtained from a speaker or from an audio output device.

The controller 100 may include elements including a digital signal processor 210 which filters the audio signal 202. The filtered signal 218 may then be provided via the digital signal processor 210 to an amplifier 230, such as a class D amplifier. The amplifier 230 may then provide (e.g., drive) the output signal 232 to one or more seat exciters. A microcontroller 220 may receive information indicative of selected intensities 224 from intensity controllers and configure the digital signal processor 210 and amplifier 230.

In some embodiments, the controller 100 may wake, or otherwise turn on or activate, based on detection of a DC offset in the audio signal 202. That is, the receipt of the audio signal 202 may cause the controller 100 to turn on. In some embodiments, the controller 100 may receiving information from a bus (e.g., a controller area network bus). The controller 100 may therefore turn on based on receipt of a particular message type (e.g., the start of audio). Optionally, the controller 100 may turn on based on a dedicated wakeup signal or based on user input to the controller 100. The user input may be with respect to a dedicated button or other input on the controller 100.

While FIG. 2A illustrates the digital signal processor 210, amplifier 230, and microcontroller 220, in some embodiments the controller 100 may include a subset of these elements. For example, the controller 100 may include the digital signal processor 210 and microcontroller 220 in a discrete unit. In this example, the amplifier 230 may be included as a separate element which is in communication with the controller 100.

The digital signal processor 210 may represent a microprocessor, application specific integrated circuit, software executed on a processor, and so on. The digital signal processor 210 may include an analog to digital converter 212 ('A/D'). As may be appreciated, the audio signal 202 may be an analog signal which is obtained from speaker 202. For example, wires which attach to positive/negative ports of the speaker 202 may be accessed. Signals from these wires may be routed to the controller 100 (e.g., via a wiring harness). In some embodiments, the audio signal 202 may be provided via an audio output device (e.g., a stereo within the vehicle). The audio signal 202 may thus, for certain outputs of the device, be analog. In some embodiments, however, the audio signal 202 may be provided as a digital signal to the controller 100. For example, the audio signal 202 may be output as a digital signal from an audio output device (e.g., a universal serial bus 'USB' signal). As another example, the audio signal 202 may be provided as a wireless signal from an audio output device within the vehicle or from a person's mobile device (e.g., Bluetooth output). For these embodiments, the digital signal processor 210 may route the digital signal directly to the filter 214, which is described below.

Filtering of the input audio signal 202 may be effectuated via the digital signal processor 210, which is represented by the filter 214 block. Filtering of the input audio signal 202 may be effectuated via the digital signal processor 201, which is represented by the filter 214 block. As may be appreciated, the filter 214 may be implemented via software elements of the digital signal processor. Thus, in some embodiments the filter 214 may filter, or otherwise transform, the audio signal 202 in the digital domain. In some embodiments, the audio signal 202 is analog, and the A/D 212 and D/A 216 will not be used, while the filter 214 may be implemented via one or more discrete hardware filters. Thus, the filter 214 may filter, or otherwise transform, the audio signal 202 in the analog domain.

The filter 214 may filter the audio signal 202 to remove frequencies which are greater than a threshold frequency. For example, the filter 214 may apply a low-pass filter (e.g., a Butterworth filter) which has a cutoff frequency of 20 Hz, 100 Hz, 1000 Hz, and so on. Since the resulting output signal 232 is configured to cause excitation of the seat exciters, such that they may rumble or shake seats, the cutoff frequency may be selected to ensure proper operation of the seat exciters. As another example, the filter 214 may apply a high-pass filter or a band pass filter with has a different cutoff frequency of 10 Hz, 20 Hz, 30 Hz, and so on.

In some embodiments, the controller 100 may connect to arbitrary seat exciters. For example, a person who owns, or is retrofitting, the vehicle may select a particular type or brand of seat exciter for use. In this example, the controller 100 may configure the filter 214 based on specifications associated with the type or brand of seat exciter. As an example, a maximum frequency associated with moving an internal element (e.g., a magnet) to cause rumbling or shaking may be identified. This maximum frequency may depend on an intensity associated with the output, such that a more complex function or set of maximum frequencies may be identified. The controller 100 may receive this configuration information via wired or wireless communication (e.g., from a user device, from the seat exciter, and so on).

In some embodiments, the filter 214 may apply one or more notch filters to exclude particular frequencies or frequency ranges. For example, subsequent to installation by an after-market installer or by a vehicle manufacturer, the controller can be configured to output frequencies from a first frequency (e.g., a lowest frequency) to a second frequency (e.g., a highest frequency). For example, the controller may output a sweep of frequencies or a frequency sweep. As another example, the controller may output pink noise or white noise. In this example, a microphone may be used to measure audible tones or resonances which are caused by the seat exciters. As will be described, the seat exciters may be mounted to a frame of a seat, such as using an MDF board optionally with foam to absorb sound. Thus, the seat exciter or mounting may be adjusted to reduce or remove any audible tones or resonances. However, certain audible tones or resonances may be associated with the vehicle itself and thus difficult to remove. In this way, the filter 214 may apply respective notch filters to substantially reduce (e.g., cancel) these audible tones or resonances. For example, the seat exciter may shake, or rumble, based on an input of a frequency or a frequency spectrum. In this example, the microphone may be used to measure whether an audible tone or resonance is greater than a threshold metric. Since the seat exciter may be configured to substantially shake or rumble, rather than produce audible sounds, a filter, or filters, may then be applied to reduce the audible tone (e.g., resulting from mechanical resonances).

While the above describes that an after-market installer or vehicle manufacturer may identify any audible tones or resonances, in some embodiments the owner of the vehicle may use an application to scan for such tones or resonances. For example, the application may represent a mobile application which the owner uses while in or proximate to the vehicle. The application may identify such tones or resonances while the controller 100 causes the seat exciters to shake or rumble according to different frequencies or frequency patterns. Any identified tones may then be provided to the controller 100 to configure respective notch filters.

Additionally, in some implementations the controller 100 may include a microphone which is configured to obtain audio during operation of the seat exciters. The digital signal processor 210 can analyze the received audio to detect any resonances or audible tones. For example, the digital signal processor 210 can identify any substantially repeating tones or tones which are separate from the audio signal 202. In this way, the digital signal processor 210 can apply notch filters in substantially real-time during operation of the seat exciters. As an example, audible tones or resonances may change over time as a vehicle owner adjusts components of the vehicle or as the seat exciters adjust over time to being in the vehicle.

After filtering by the filter 214, the digital signal processor 210 may provide the filtered digital signal to a digital to analog converter ('D/A) 216. The D/A 216 may then transform the digital signal into an analog filtered signal 218 for output to an amplifier 230. In some embodiments, the digital signal processor 210 may output a digital signal to the amplifier 230 which may include its own D/A to transform the signal into the analog domain.

In some embodiments, the digital signal processor 210 may be used to analyze the audio signal 202 and adjust operation of the controller 100. As an example, the digital signal processor 210 may execute a particular machine learning model (e.g., a neural network, such as a convolutional neural network) to identify a type of music associated with the audio signal 202. Example types of music may include rock, jazz, rap, classical, electronic dance music, and so on. Different audio profiles may be accessed via the controller 100 to adjust operation of the seat exciters based on the identified type of music.

For example, different types of filters may be applied via the filter 214 based on the identified music type. In this example, cutoff frequencies may be adjusted depending on whether the music is identified as classical or electronic dance music. As may be appreciated, classical music may have less repeating lower-end notes such that the cutoff frequency may be set higher than for electronic dance music with more repeating bass notes. Additionally, an intensity associated with identified repeating notes may be reduced while more irregular sounds may have a higher intensity.

In some embodiments, the digital signal processor 210 may be used to identify whether the audio signal 202 is indicative of music or of other types of audio. For example, the controller 100 may distinguish between a phone call being taken by a passenger in the vehicle from music. As another example, the controller 100 may distinguish between sounds output via the vehicle related to operation of the vehicle and music. Certain vehicles may, for example, output phone calls over the driver-side (e.g., front-left speaker in the U.S.) but not the remaining speakers in the vehicle. If the controller 100 is connected to more than one speaker then the controller 100 can determine that no audio is coming from the passenger (e.g., front-right) or other speakers. As described above with respect to FIG. 1B, two or more controllers may be used. In some embodiments, one controller may be connected to a driver-side speaker and another controller connected to a different speaker (e.g., the passenger-side speaker). Thus, the controllers may determine that audio is coming out of just the driver-side speaker and identify the occurrence of a call. Additionally, in implementations in which the controller has a microphone, the controller 100 may identify that audio signal 202 represents speaking. Additionally, the controller 100 may be in wireless communication with the vehicle and may be alerted that music is ending and a call is starting.

In the above embodiments, the controller 100 may cause a temporary stop in activation of the seat exciters. For example, during the call the seat exciters may be turned off via the controller stopping the generation of output signal 232. In this way, the persons within the vehicle may avoid having to reduce the intensity associated with the seat exciters if they become active during the call.

The controller 100 further includes a microcontroller 220 which configures the digital signal processor 210 and amplifier 230. The microcontroller 220 may also turn on/turn off the controller 100. As illustrated, the microcontroller 220 may receive intensity information 224 from intensity controllers positioned within the vehicle. The intensity information 224 may represent selection of an intensity based on input provided by a person to an intensity controller. For example, there may be a range of intensities capable of selection and the person may interact with the intensity controller to select, or otherwise indicate, a particular intensity.

In some embodiments, the intensity controllers may represent potentiometers which are usable to select an intensity or volume of a seat exciter. For example, the potentiometer may be mounted in a plastic assembly and may be mounted in cutout in a face plate of a seat (e.g., plastic or vinyl face plate). Adjustment of the intensity or volume may be caused by an up-down motion vertically along a face of the intensity controller.

The microcontroller 220 may optionally control lights which are included in, or positioned on, the intensity controllers. The lights may reflect current operation of the seat exciters and/or may indicate an intensity current selected. Optionally, the lights may be adjusted to conform to frequency information in the filtered signal 218. Thus, the microcontroller 220 may output lighting information 226 for adjustment of lights (e.g., light emitting diodes) of the intensity controllers. For example, the lighting information 224 may adjust light emitting diode drivers.

The illustrated configuration information 222 may be used to configure or define filters effectuated by filter 214. Additionally, the configuration information 222 may adjust output of the amplifier 230. For example, the configuration information 222 may set the gain of the amplifier 230 based on the intensity information 224. Optionally, the gain of the amplifier 230 may be set to accommodate gain associated with a highest possible intensity set by a person within the vehicle. An additional element may be positioned earlier in the signal path from the amplifier 230 which allows for a reduction in intensity of a signal according to a setting of an associated intensity controller.

In some embodiments, the amplifier 230 may be at a fixed gain. The digital signal processor 210 may adjust the filtered signal 218 based on the intensity information 224. For example, the microcontroller 220 may indicate in the configuration information 222 a specified intensity. In this example, the digital signal process 210 may adjust a multiplier which is applied. In some embodiments, the multiplier may be between 0 and 1 and an increased intensity may raise the multiplier closer to 1. In embodiments in which the amplifier 230 has adjustable gain (e.g., adjustable volume), the intensity information 224 may be used to adjust the volume. For example, the configuration information 222 may configure the volume associated with the amplifier 230. The amplifier 230 may optionally have two or more outputs. Thus, the amplifier 230 may cause output of the two or more seat exciters with different intensities.

Once configured, the amplifier 230 may therefore generate output signals 232 to the seat exciters. As described above, the digital signal processor 210 may filter the audio signal 202 such that the output signals 232 cause activation of the seat exciters in a manner which focuses on lower-end frequencies of the audio signal 202. In this way, the persons within the vehicle can obtain a tactile feel to the music which is otherwise unachievable.

FIG. 2B is an example image depicting a seat exciter 254, controller 242, and intensity controller 250. In the illustrated example, the intensity controller 250 may adjust intensity as described herein via adjustment of the rolling or clicking portion 256. For example, a passenger may rotate the portion upwards or downwards to indicate greater, or lesser, intensity.

FIG. 3 illustrates an example seat exciter 302 mounted on a rear of a vehicle seat 300 which does not include venting. In the illustrated example, the seat exciter 302 is attached to a board (e.g., a medium density fiber 'MDF' board) 304 which is connected to the seat 300. For example, the connection may be made to springs or a frame of the seat 300. In this example, the connection is effectuated via ties 306 which are attached to the springs or frame. The seat exciter 302 is positioned at a lower, and central, portion of the seat 300.

FIG. 4 illustrates an example seat exciter 402 mounted on a rear of a vehicle seat 400 which includes venting. In the illustrated example, the seat exciter 402 is attached to a board 404 (e.g., wood, MDF) which is connected to an underlying frame of the seat. For example, the connection may be effectuated via screws in this embodiment. The seat exciter 402 is positioned at a central portion of the board 404 and at a lower portion of the seat 400.

FIGS. 5A-5G illustrate embodiments which utilize a mounting mechanism 502 to attach a seat exciter to a seat 500. In some embodiments, the mounting mechanism 502 may be made or formed from metal and/or plastic.

Figure 5A:
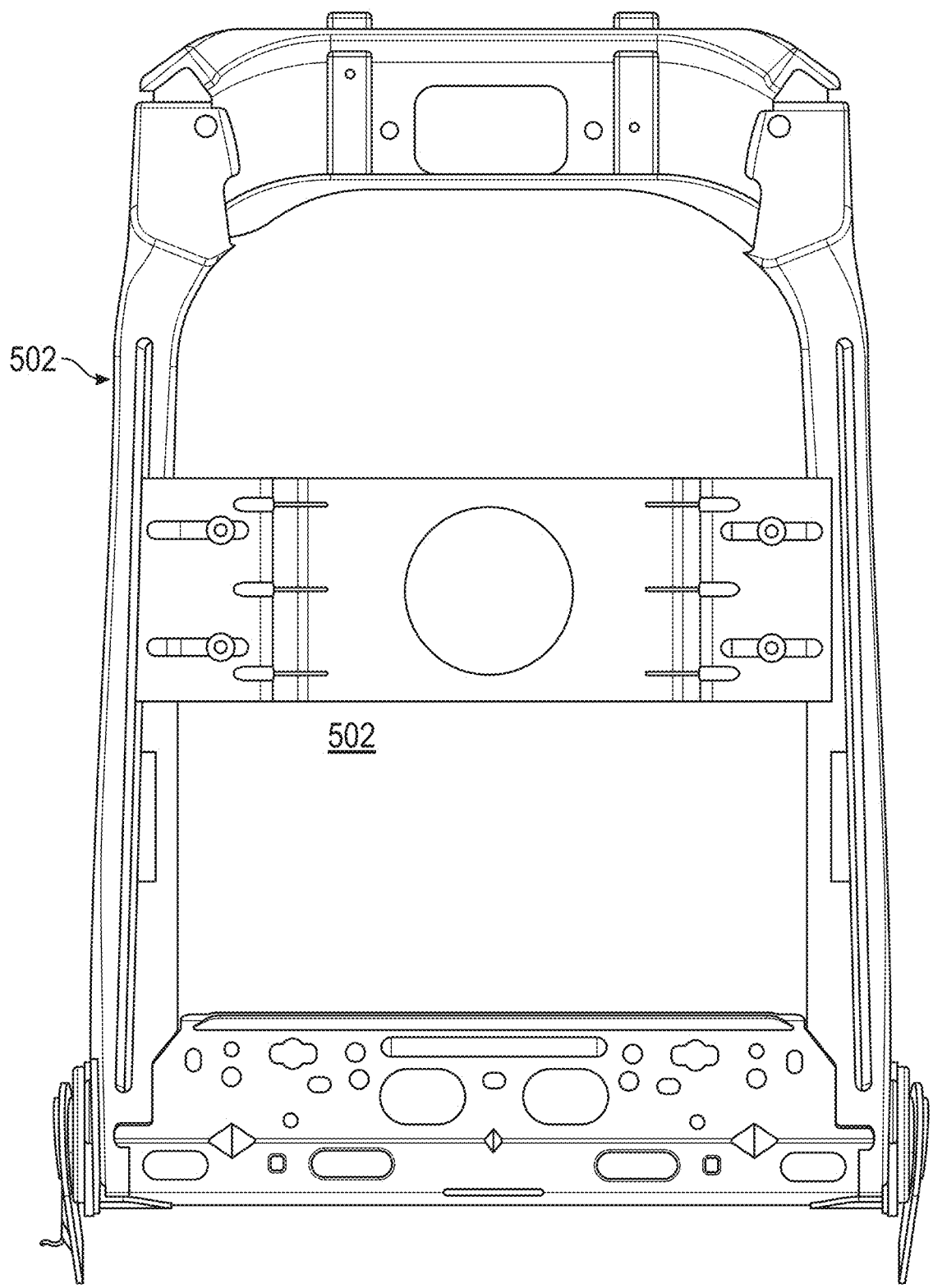
FIGS. 5A-5H illustrate embodiments which utilize a mounting mechanism to attach a seat exciter to a seat.
Figure 5B:
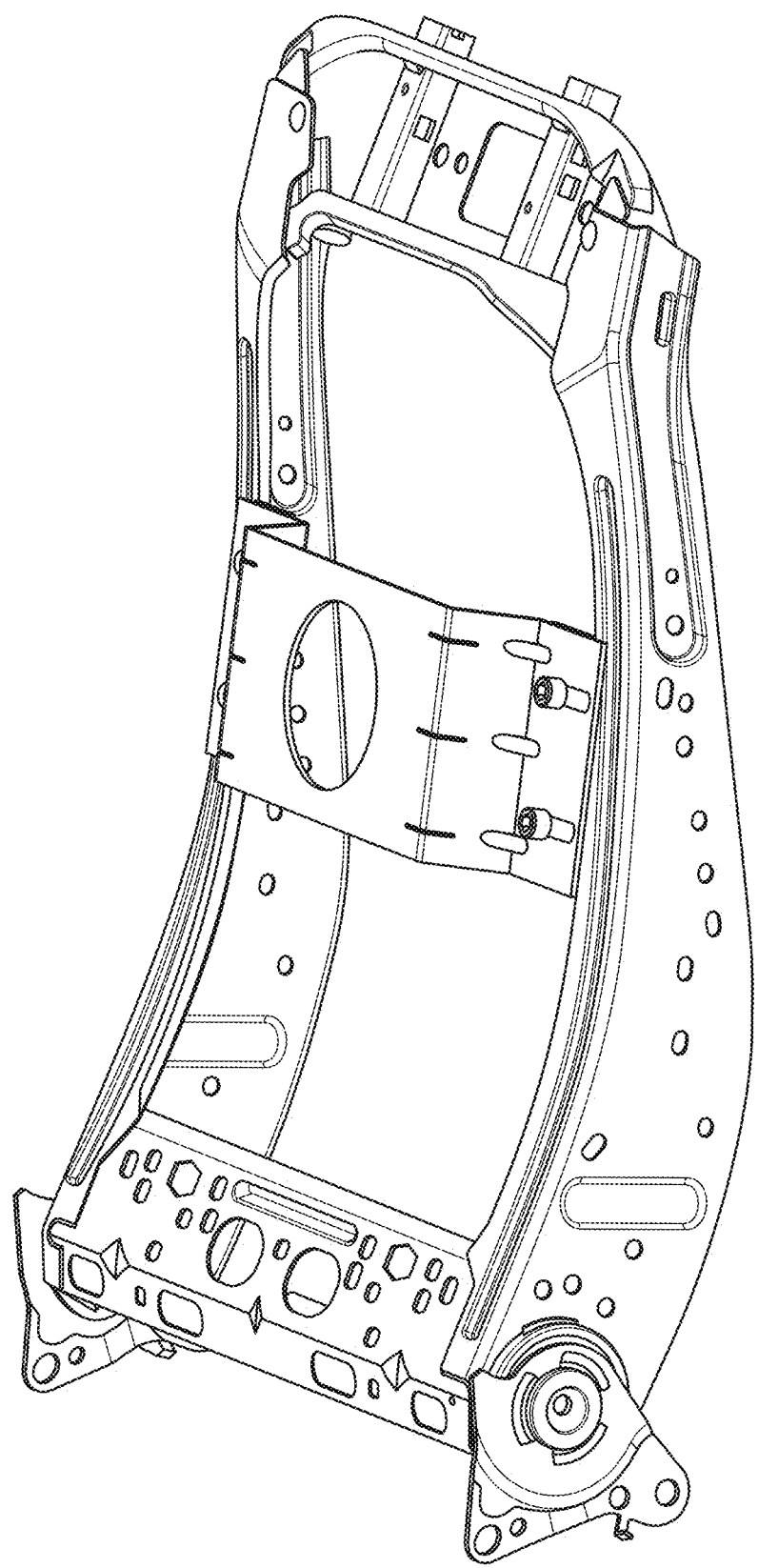
Figure 5C:
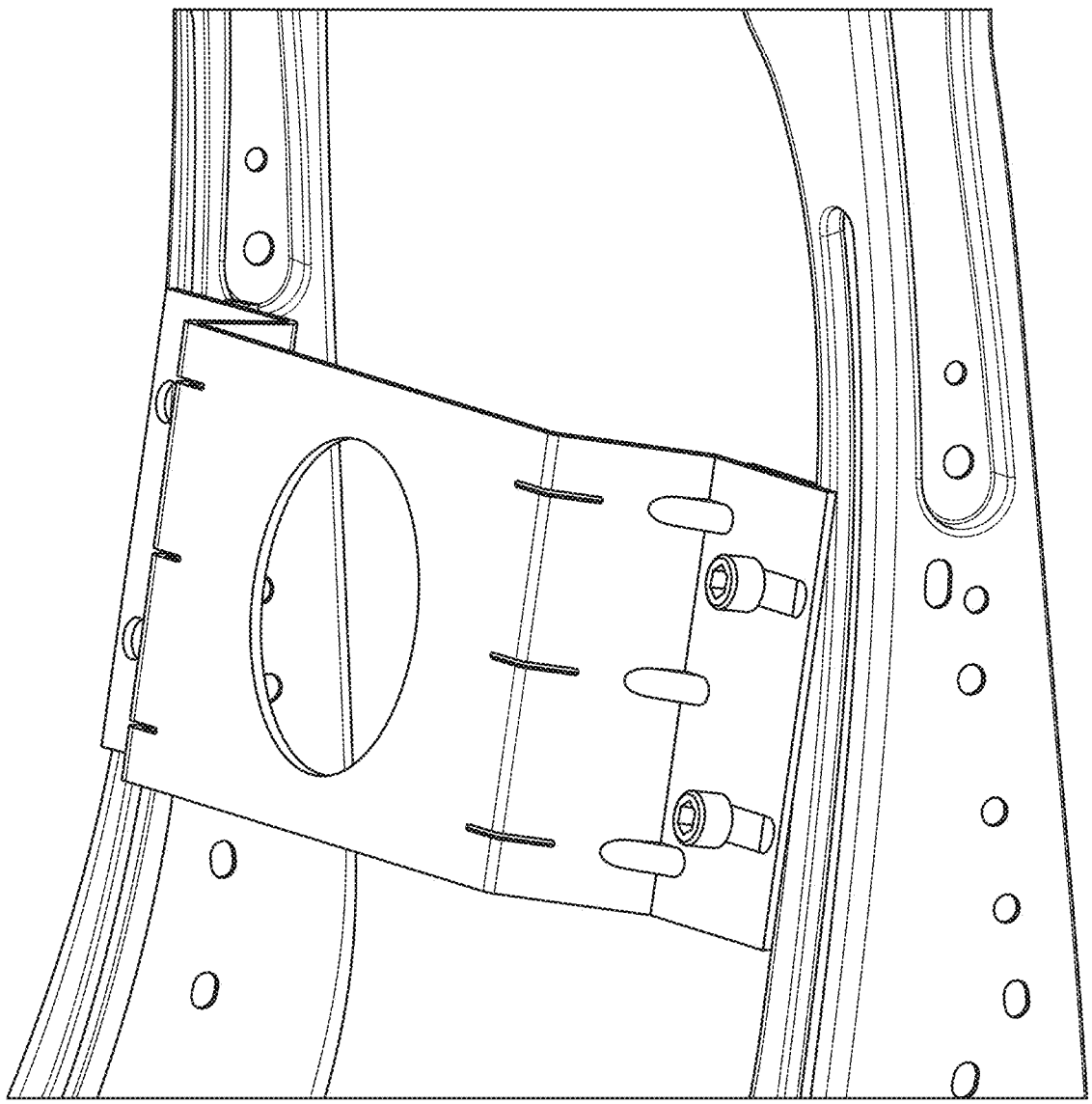
Figure 5D:
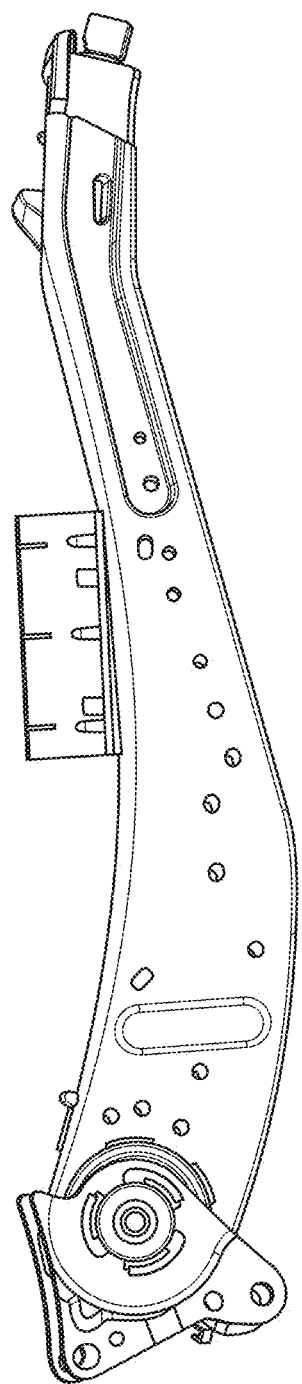
Figure 5E:
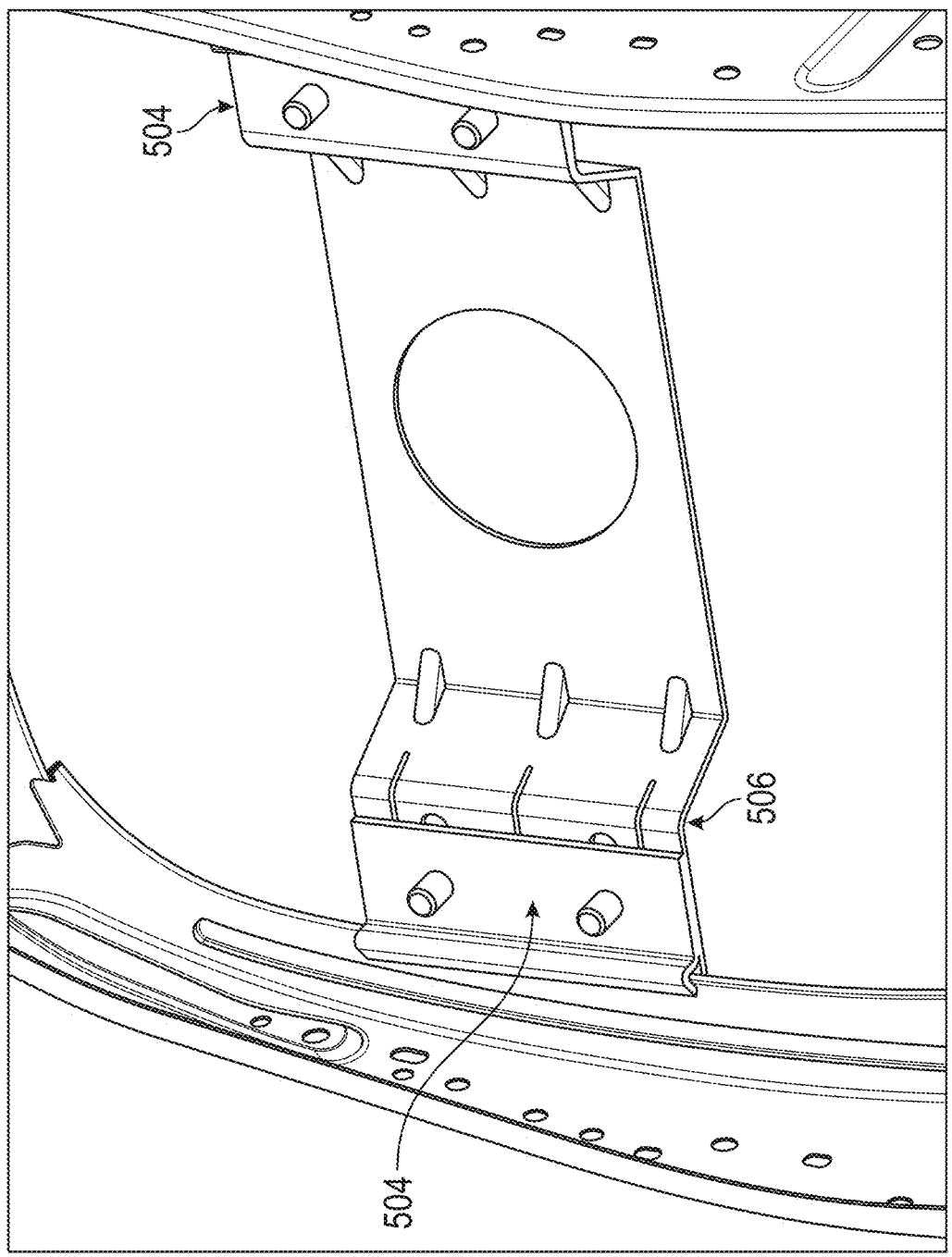
Figure 5F:
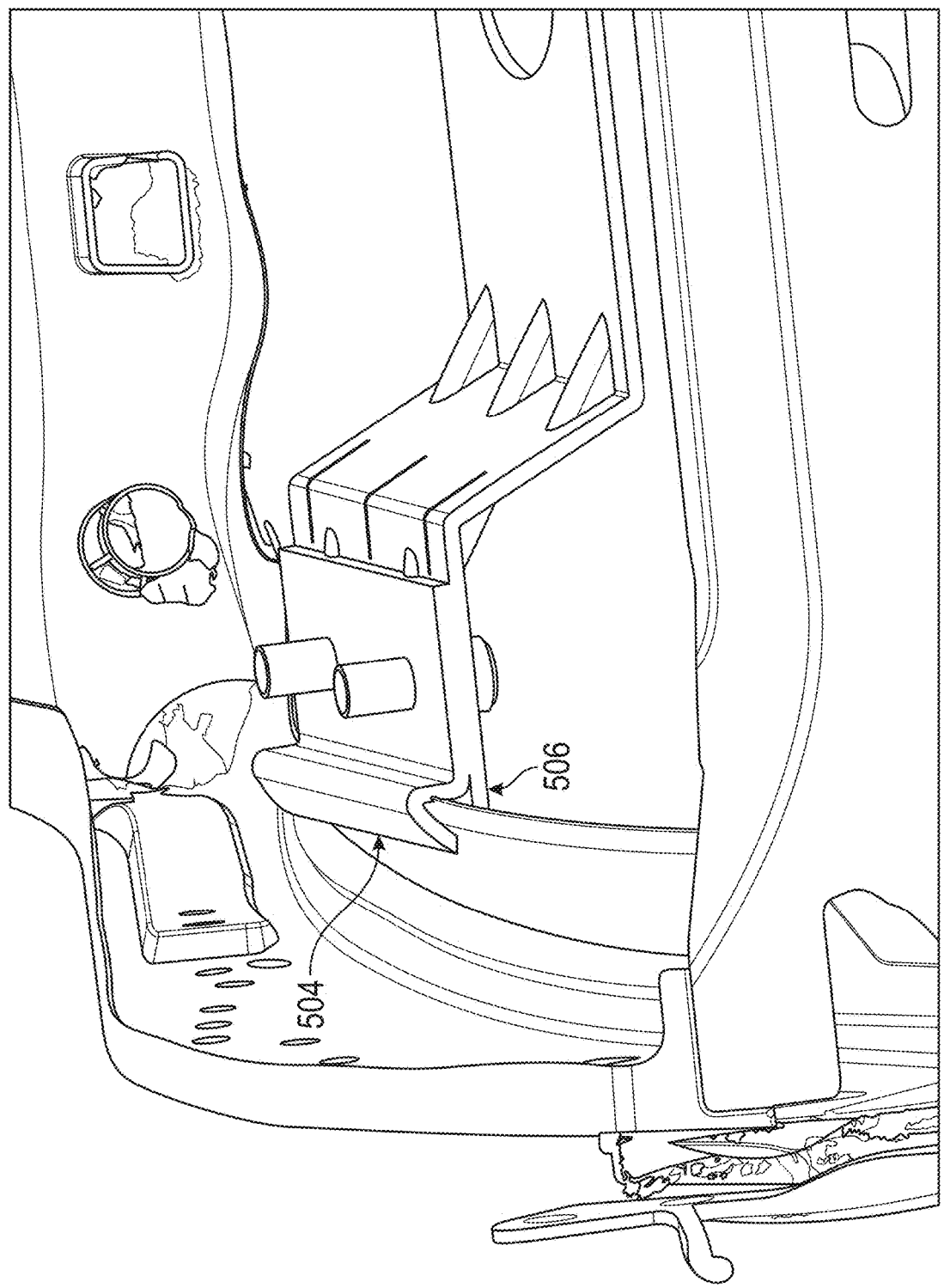
Figure 5G:
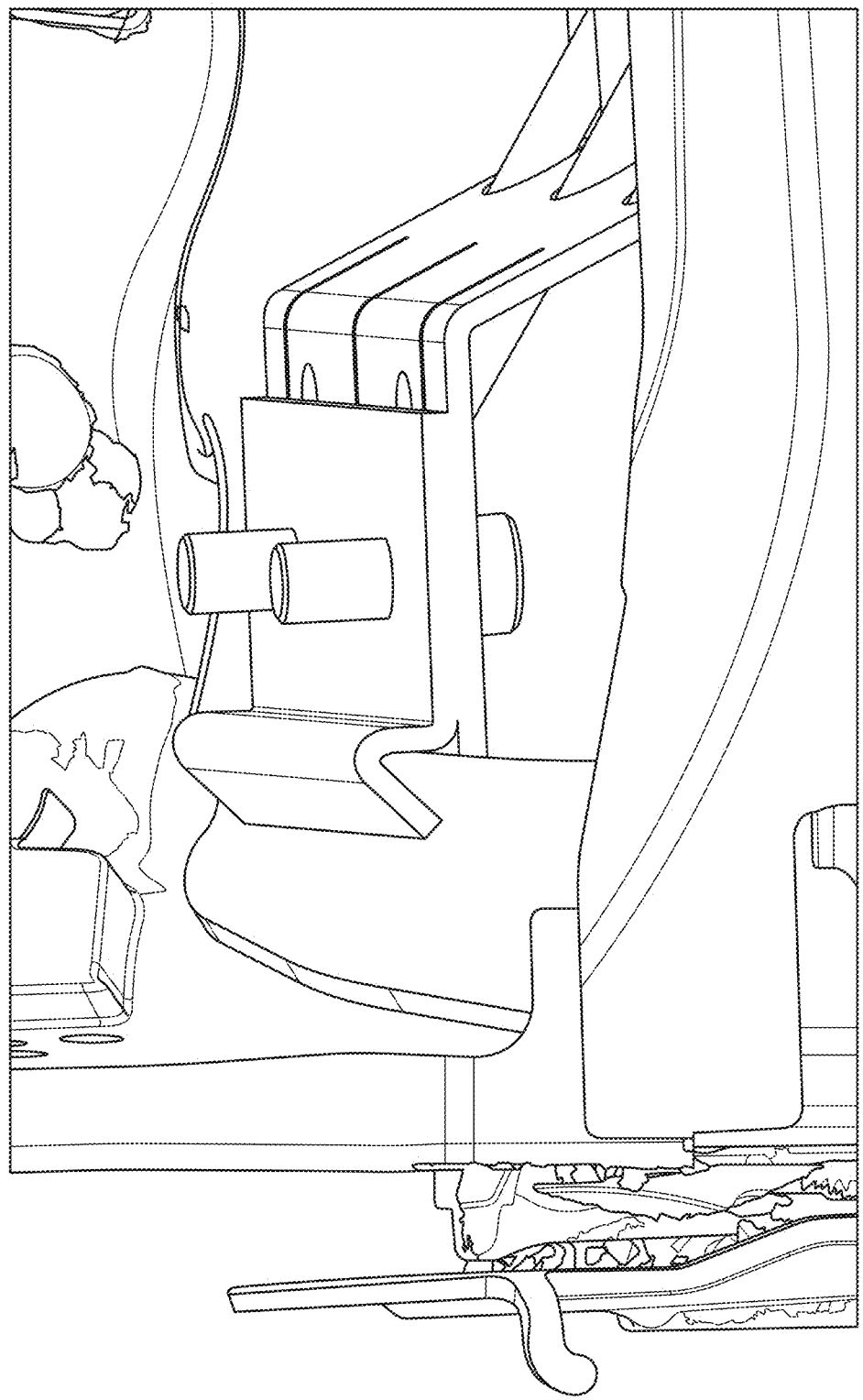

As illustrated in FIG. 5F, the mounting mechanism 502 may have a first portion 504 (e.g., metal or plastic portion) which abuts a rear of the seat 500 on a particular side (e.g., left side in the illustration). For example, the first portion 504 may extend a threshold distance to the left from the right-most portion of the particular side). In some embodiments, the first portion 504 may have a shape (e.g., the sloping shape of FIG. 5F) which causes the first portion 504, for example when compressed, to remain stuck or attached to the seat 500.

Similarly, the mechanism 502 may have a second portion 506 (e.g., metal or plastic portion) which abuts a front of the seat. This second portion 506 may extend across the seat 500 (e.g., as illustrated in FIG. 5E). In addition, on the other side (e.g., ride side of the illustration), a corresponding first portion may abut, touch, connect to, the other side of the second portion 506. The first portions 504 and second portion 506 may be compressed together. For example, one or more screws, fasteners, bolts, and so on, optionally in combination with one or more washers or threaded receiver, may be used. In this example, the first portions 504 and second portion 506 may compress such that the mechanism 502 is attached to the frame of the seat 500.

Figure 5H:
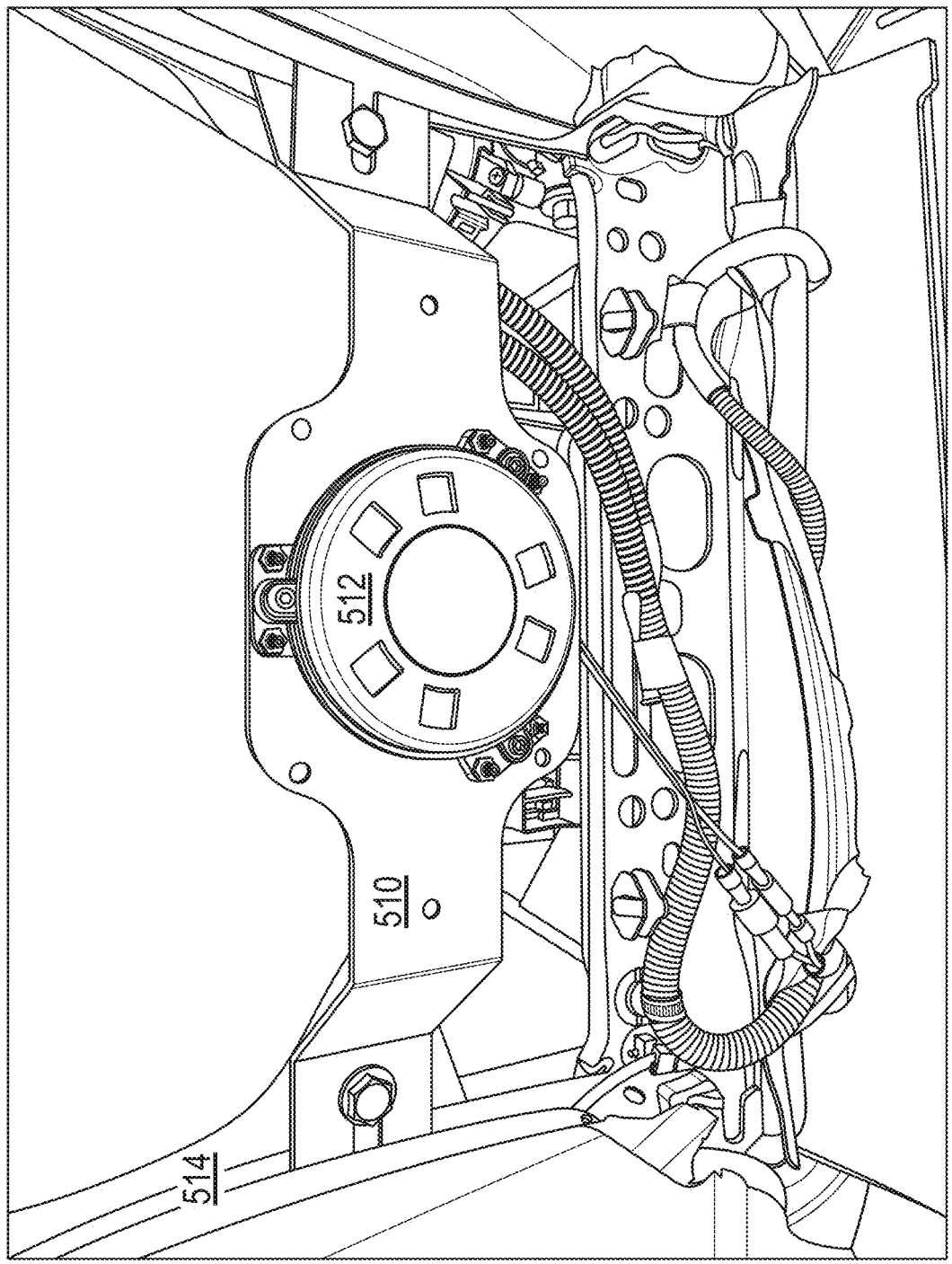

FIG. 5H illustrates an example installation of a seat exciter 512 onto a seat 514 using an example mounting mechanism 510.

Figure 6:
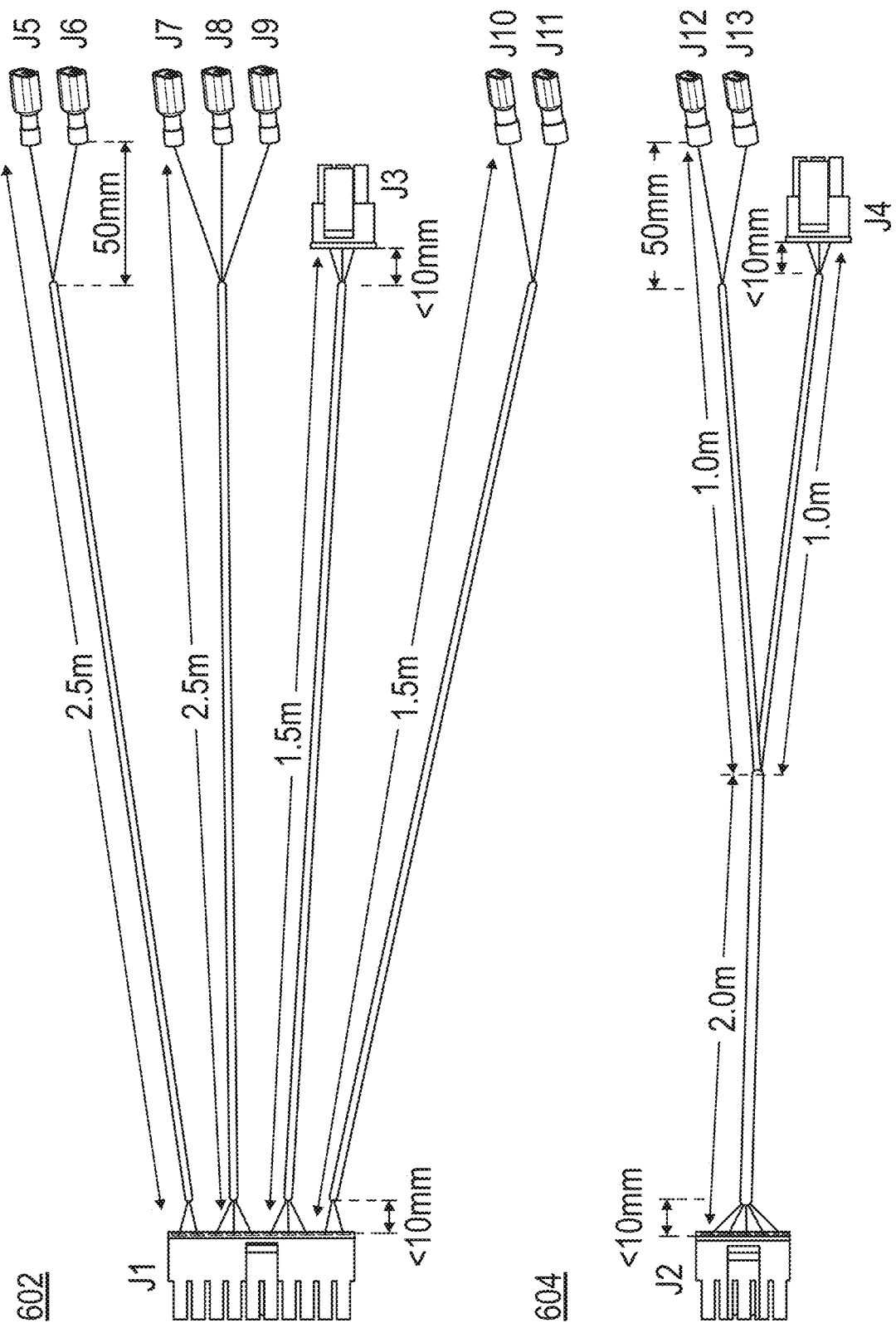
FIG. 6 illustrates example wiring harnesses.

FIG. 6 illustrates example wiring harnesses. In the illustrated embodiment, wiring harness 602 is depicted. This harness 602 may represent a main harness which connects to the controller described herein. Passenger harness 604 is additionally illustrated, which may represent a harness that connects to a seat exciter attached to a seat for a passenger.

Example Flowcharts

Figure 7A:
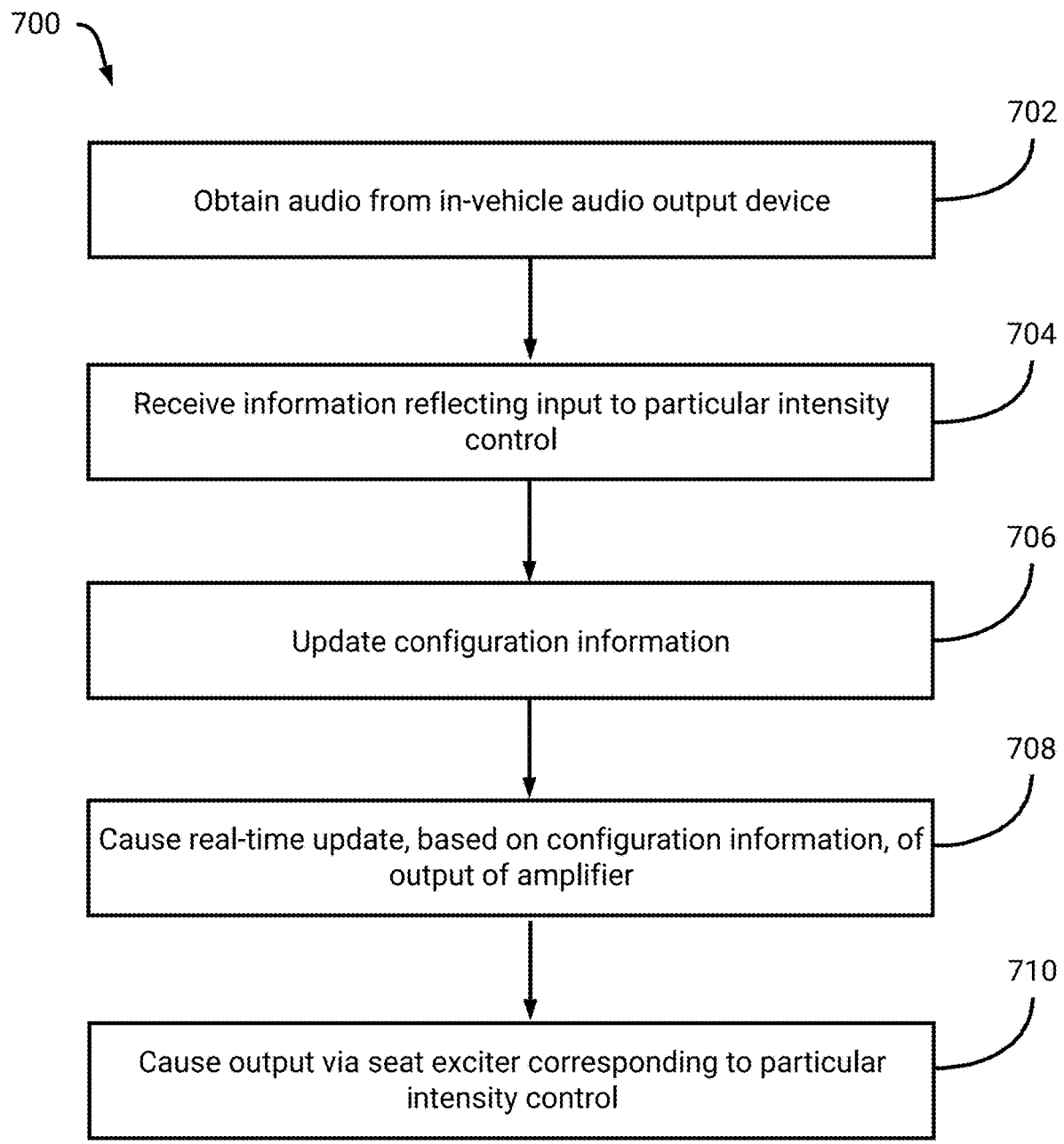
FIG. 7A is a flowchart of an example process to cause output from a seat exciter included in a vehicle.

FIG. 7A is a flowchart of an example process 700 to cause output from a seat exciter included in a vehicle. For convenience, the process 700 will be described as being performed by a controller or unit of one or more processors (e.g., the controller 100).

At block 702, the controller obtains audio from an in-vehicle audio output device. As described above, one or more vehicle passengers can listen to audio via an audio output device over the speakers of the vehicle. For example, the audio may represent radio, streaming audio, and so on.

At block 704, the controller receives information reflecting a particular intensity provided by an intensity controller. Each passenger can use a respective intensity controller to adjust intensity of his/her seat exciter. Additionally, each passenger can turn on/turn off his/her seat exciters. The intensity controller may represent an input device which is a passenger can adjust, for example via movement of a scroll wheel or input technique.

At block 706, the controller updates configuration information. The controller, such as the microcontroller included in the controller (e.g., as described in FIG. 2A), can update information associated with a specified intensity.

At block. 708, the controller causes updating of an amplifier based on the configuration information. The specified intensity may be used to set gain or volume of an amplifier or to adjust an input signal into the amplifier with constant gain. For example, a digital signal processor included in the controller may be updated to specify a multiplier as described above.

At block 710, the controller causes output via a seat exciter corresponding to the specified intensity. The output may be based on an output of a digital signal processor which filters, or otherwise transforms, input audio. The controller may adjust this output to correspond with the specified intensity with an amplifier of constant gain or may adjust the amplifiers gain as described above. Subsequently, the output from the amplifier may be provided to the seat exciter.

Advantageously, the output of the seat exciter may be adjusted in intensity in accordance with a volume of the audio output device. For example, the volume of the audio output device may be adjusted upwards. In this example, the volume of speakers included in the vehicle may thus be increased. The controller may preserve this increase in volume such that the output of the seat exciter may be similarly increased.

Figure 7B:
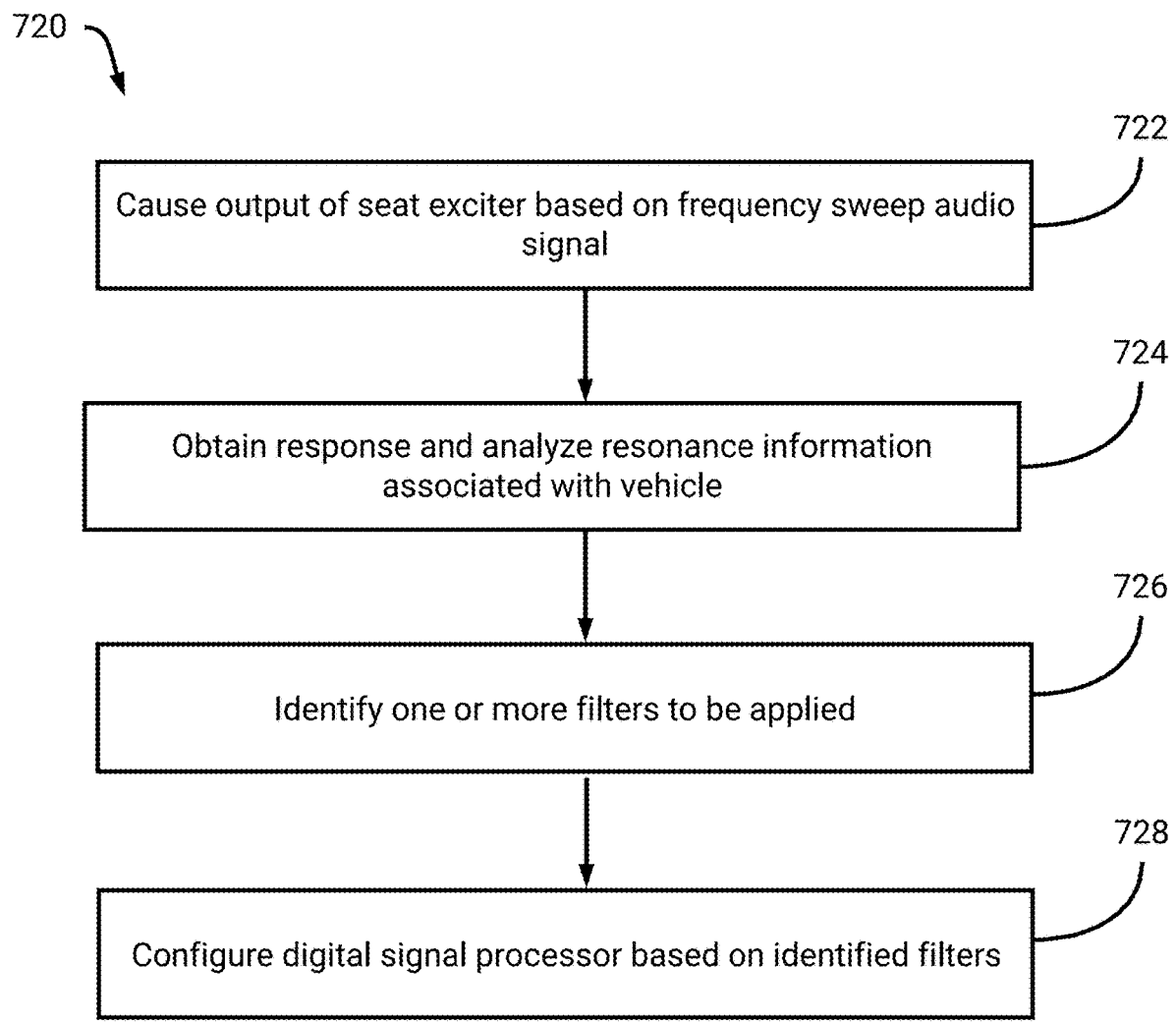
FIG. 7B is a flowchart to configure a digital signal processor which filters input audio.

FIG. 7B is a flowchart to configure a digital signal processor which filters input audio. The configuration may be used to identify any tones or resonances associated with a vehicle and apply filters to substantially reduce these tones or resonances. For convenience, the process 720 will be described as being performed by a controller or unit of one or more processors (e.g., the controller 100).

At block 722, the controller causes output of a seat exciter included in a vehicle based on a frequency sweep audio signal. The frequency sweep audio signal may represent a sweep of frequencies between a first frequency and a second frequency. The audio sweep signal may be generated by the controller. For example, during initial configuration and/or installation of the controller and seat exciter(s), the controller may be configured to play audio to test for resonances. For example, an initial boot up or configuration process may be performed in which the controller generates tones which form the frequency sweep to be output via the seat exciter(s).

At block 724, the controller obtains response information and analyzes resonance information. The controller, or another system or device, may obtain audio (e.g., via a microphone) which represents the response of the vehicle to the frequency sweep. The controller, or another system or device, may then analyze the response information for resonance information.

At block 726, the controller identifies one or more filters to be applied. The controller may identify frequencies associated with resonance (e.g., via use of a frequency transform, such as a fast Fourier transform). For example, the identified frequencies may be associated with a response (e.g., an audible sound) greater than a threshold measure (e.g., greater than a threshold decibel). Subsequently, the controller may identify notch filters usable to reduce the audible and/or tactile impact of the resonance.

At block 728, the controller configures the digital signal processor included in the controller based on the identified filters. For example, the microcontroller included in the controller may provide information to the digital signal processor to apply the identified filters.

Figure 8:
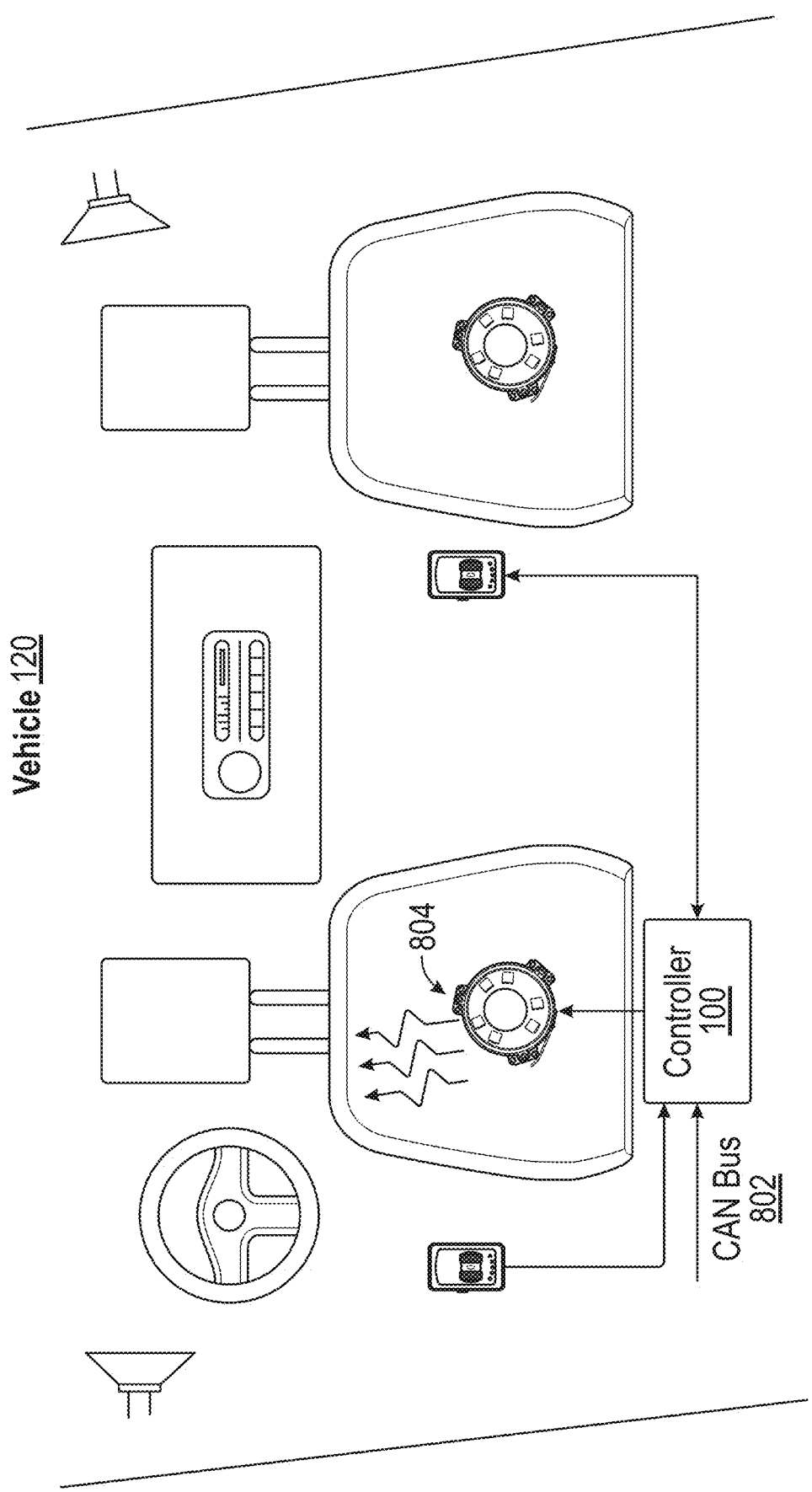
FIG. 8 is a block diagram of a vehicle which includes seat exciter(s) and a controller in communication with a controller area network (CAN) bus.

FIG. 8 is a block diagram of a vehicle 120 which includes seat exciter(s) 804 and a controller 100 in communication with a controller area network (CAN) bus 802. In some embodiments, in addition to causing output of a seat exciter 804 based on music being played, the controller 100 may cause shaking or rumbling of a seat based on messages being provided via the CAN bus 802.

For example, the CAN bus 802 may pass one or more messages which indicate that another vehicle is rapidly approaching the vehicle 120 from the rear. In this example, the messages may be used to activate a light on a particular side mirror of the vehicle which alerts the driver to the other vehicle. The controller 100 may analyze these messages, for example via analyzing the CAN messages, and cause output of specific shaking or rumbling patterns or tones based on the messages.

For example, the controller 100 may be configured to identify a subset of the message types which are provided on the CAN bus. In this example, a driver may use an application or software to configure the specific messages which he/she prefers to be alerted about via the seat exciter 804. Additionally, the driver may select a particular pattern to be output from the seat exciter 804 or a constant frequency to be played. Optionally, the driver may indicate that certain messages are to be associated with output from seat exciters of passengers (e.g., incoming calls).

Figure 9:
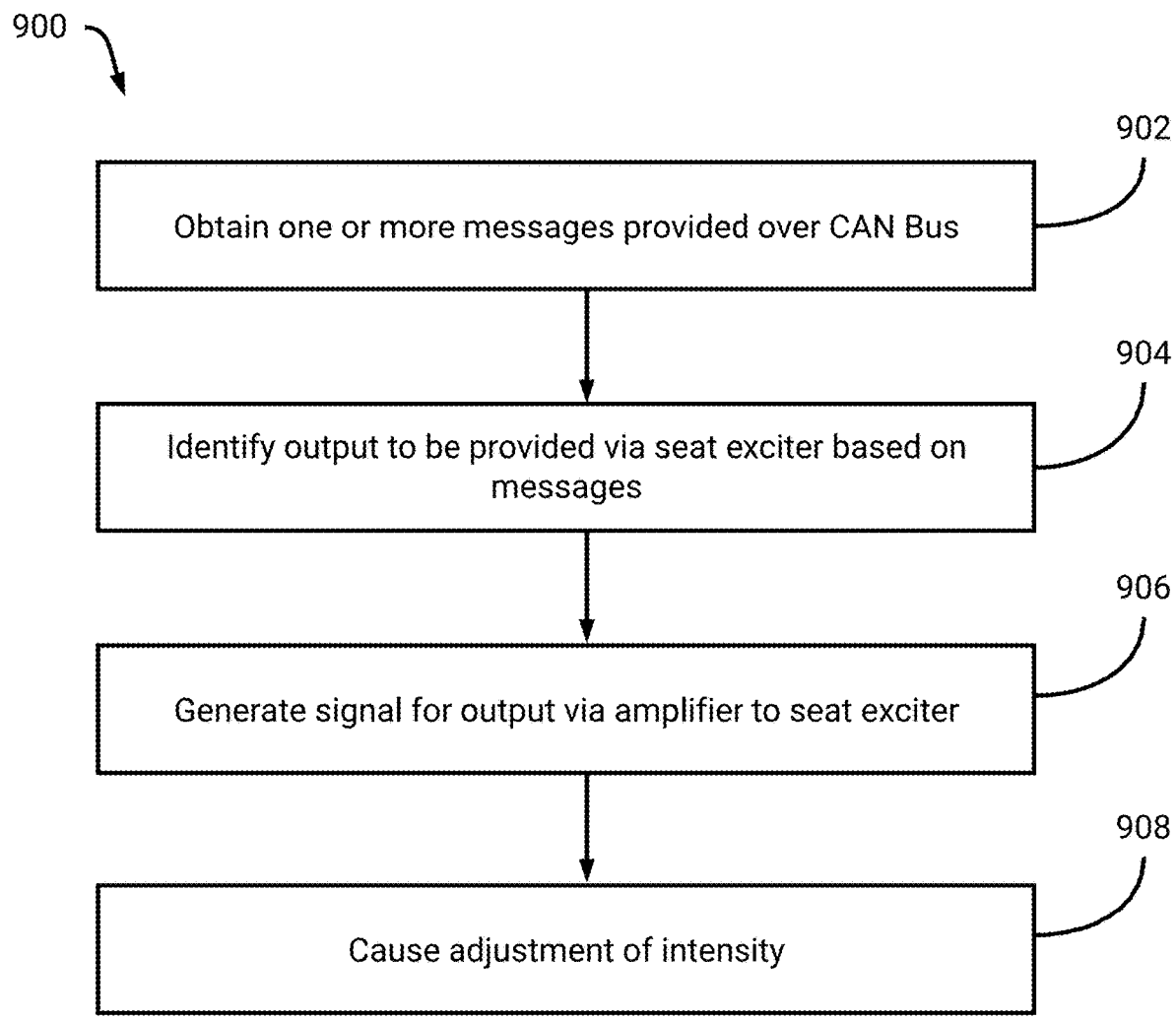
FIG. 9 is a flowchart of an example process for causing output of a seat exciter based on a controller area network (CAN) bus.

FIG. 9 is a flowchart of an example process 900 for causing output of a seat exciter based on a controller area network (CAN) bus. For convenience, the process 900 will be described as being performed by a controller or unit of one or more processors (e.g., the controller 100).

At block 902, the controller obtains one or more messages provided over the CAN bus. At block 904, the controller identifies output to be provided via a seat exciter based on the messages. At block 906, the controller generates signals for output to a seat exciter. The controller may generate a signal to be provided to the amplifier described herein to allow for the seat exciter to be activated. The signal may correspond with a particular pattern or tone selected by a driver or may correspond with a default pattern or tone.

At block 908, the controller optionally adjusts an intensity based on the messages. The amplifier, or digital signal processor, may be configured to allow for adjustment of an intensity. For example, certain messages (e.g., autonomous driving messages, alerts, and so on) may be associated with increased intensity as compared to other messages (e.g., incoming calls).

Figure 10:
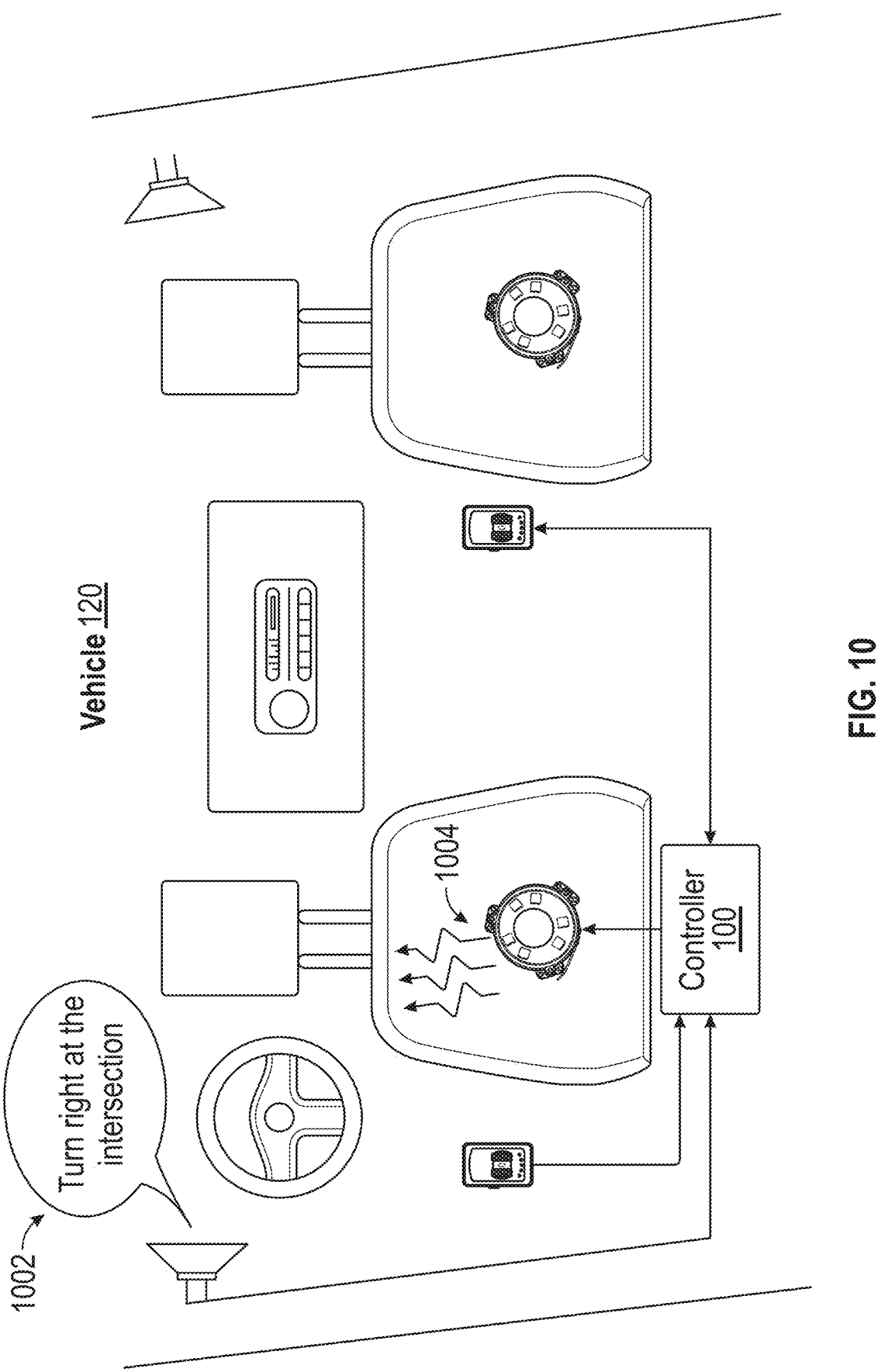
FIG. 10 is a block diagram of a vehicle which includes seat exciter(s) and a controller configured to analyze verbal commands.

FIG. 10 is a block diagram of a vehicle 120 which includes seat exciter(s) 1004 and a controller 100 configured to identify words or verbal commands 1002 in incoming audio. For example, the controller 100 may identify navigation instructions being output via a driving application. In this example, the output may be provided via speakers of the vehicle 120. In some embodiments, the output may be provided via a mobile device which is wirelessly connected to the controller 100. The controller 100 may execute one or more machine learning models to identify specific terms, words, phrases, commands, and so on, which are being provided. In response to certain commands, the controller 100 may cause activation of seat exciter 1004.

For example, the above-described driving application may alert a driver to turn right at an upcoming intersection. In this example, the controller 100 may identify a specific command of interest e.g., turn) and then cause activation of the seat exciter 1004. Similar to the above, for example with respect to FIGS. 8-9, the controller 100 may generate a signal to cause activation of the seat exciter 1004.

In some embodiments, the controller 100 may analyze incoming audio from a mobile device. That is, the mobile device may output auditory driving commands via its speaker(s). Thus, the controller 100 may not be receiving an audio signal from the vehicle's speakers. Optionally, the controller 100 may have a microphone which is configured to obtain audio being played via the mobile device. In this way, the controller 100 may, as described above, identify specific terms, words, phrases, commands, and so on.

Other Embodiments

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A system configured for inclusion in a vehicle, the system comprising:
    a first seat exciter configured for attachment to a first seat within the vehicle, the first seat being a driver-side seat, and the first seat exciter configured to vibrate the first seat based on output from a controller;
    a second seat exciter configured for attachment to a second seat within the vehicle, the second seat being a passenger-side seat, and the second seat exciter configured to vibrate the second seat based on output from the controller;
    the controller, the controller being configured to obtain an audio signal and generate a filtered signal for input to the first seat exciter and the second seat exciter, wherein the controller is wired to a driver-side speaker configured to output the audio signal; and
    a plurality of intensity controllers in wired communication with the controller, wherein the intensity controllers are discrete units configured for individual operation by respective passengers within the vehicle and are configured to cause adjustment of intensities associated with vibration of the first seat exciter and the second seat exciter based on receipt of respective user input from the passengers.

2. The system of claim 1, wherein the first seat exciter and the second seat exciters are tactile transducers, wherein the first seat exciter is attached to the first seat via a mounting mechanism, wherein the mounting mechanism is configured for attachment to a frame of the first seat, and wherein the mounting mechanism includes a first portion configured to be disposed on a first side of the frame and a second portion configured to be disposed on a second side of the frame, and wherein the first portion and the second portion are configured to compress thereby attaching the mounting mechanism to the frame.

3. The system of claim 2, wherein the mounting mechanism is formed from metal or plastic.

4. The system of claim 2, wherein one of the first portion and the second portion includes a plurality of holes, and wherein the remaining of the first portion and the second portion includes a plurality of extending members configured for insertion in the holes.

5. The system of claim 2, wherein the mounting mechanism includes a central portion in which the first seat exciter is configured for inclusion.

6. The system of claim 1, wherein the controller comprises a digital signal processor, a microcontroller, and an amplifier.

7. The system of claim 6, wherein the digital signal processor is configured to apply one or more filters to the audio signal, and wherein the filters comprise a low-pass filter and/or a high-pass filter.

8. The system of claim 7, wherein the filters further comprise a notch filter configured to substantially cancel an audible tone or resonance associated with output via the first seat exciter.

9. The system of claim 6, wherein the microcontroller adjusts a multiplier applied by the digital signal processor to an output signal of the digital signal processor.

10. The system of claim 6, wherein the amplifier drives the filtered signal to the first seat exciter and second seat exciter, and wherein the amplifier provides constant gain or is adjustable in volume via the intensity controllers.

11. The system of claim 1, wherein a volume associated with the audio signal is correlated with the respective intensities of the first seat exciter and second seat exciter, such that adjustment of the volume provides corresponding adjustment of intensities, and wherein for the volume, a first intensity associated with the first seat exciter is greater than a second intensity associated with the second seat exciter.

12. The system of claim 1, wherein the controller is configured to receive messages provided via a controller area network (CAN) bus of the vehicle, and wherein the controller causes the first seat exciter to output vibration patterns based on the messages.

13. A controller configured for inclusion in a vehicle, the controller being in communication with a plurality of seat exciters configured for attachment to respective seats within the vehicle, wherein the controller comprises:
a digital signal processor configured to:
filter an audio signal being generated by an audio device positioned within the vehicle, the audio device being a driver-side speaker configured to output the audio signal and the controller being wired to the driver-side speaker, and
generate a filtered audio signal to an amplifier;
a microcontroller configured to:
receive, from a plurality of intensity controllers, information specifying intensities associated with the seat exciters, the seat exciters including at least a first seat exciter attached to a driver-side seat and a second seat exciter attached to a passenger-side seat, wherein the intensity controllers are discrete units configured for individual operation by respective passengers within the vehicle and are configured to cause adjustment of intensities associated with vibration of respective seat exciters based on receipt of user input from the passengers, and
configure the digital signal processor and/or amplifier based on the specified intensities; and
the amplifier, the amplifier configured to drive signals to the seat exciters based on the filtered audio signal to cause activation of the seat exciters, wherein activation of the seat exciters is associated with vibration of the seats.

14. The controller of claim 13, wherein the digital signal processor filters the audio signal via one or more filters, and wherein the filters comprise one or more of a low-pass filter, a high-pass filter, or a band pass filter.

15. The controller of claim 13, wherein the microcontroller configures the digital signal processor based on the specified intensities via adjusting one or more multipliers applied to the audio signal via the digital signal processor.

16. The controller of claim 13, wherein the microcontroller provides information to the intensity controllers which are configured to activate lights included in the intensity controllers.

17. The controller of claim 13, wherein the seat exciters are tactile transducers.

18. The controller of claim 13, wherein a volume associated with the audio signal is correlated with intensities of the seat exciters, such that adjustment of the volume provides corresponding adjustment of intensities, and wherein for the volume, a first intensity associated with a first seat exciter is greater than a second intensity associated with a second seat exciter.

19. A method implemented by a system configured for inclusion in a vehicle, the system causing vibration of seats included in the vehicle according to an audio signal, and the method comprising:
obtaining the audio signal via an audio device included in the vehicle, the audio device being a driver-side speaker and the system being wired to the driver-side speaker;
filtering the audio signal via application of one or more of a low-pass filter, a high-pass filter, or a band-pass filter, wherein the filtered audio signal is provided to an amplifier;
receiving information specifying intensities associated with vibration of respective seats in the vehicle, the seats including at least a driver-side seat and a passenger-side seat, and the information being provided via intensity controllers operated by persons within the vehicle; and
causing output to a plurality of seat exciters configured for attachment to the seats, wherein output is driven via the amplifier and wherein the output is adjustable via the received information,
wherein the intensity controllers are discrete units configured for individual operation by respective passengers within the vehicle and are configured to cause adjustment of intensities associated with vibration of respective seat exciters based on receipt of user input from the passengers.

20. The method of claim 19, wherein a volume associated with the audio signal is correlated with intensities of the seat exciters, such that adjustment of the volume provides corresponding adjustment of intensities, and wherein for the volume, a first intensity associated with a first seat exciter is greater than a second intensity associated with a second seat exciter.

* * * * *